(12) United States Patent
Ormeno et al.

(10) Patent No.: US 11,732,325 B2
(45) Date of Patent: Aug. 22, 2023

(54) ACID BALANCE IN A CHLORIDE HEAP LEACH

(71) Applicant: BHP CHILE INC, Santiago (CL)

(72) Inventors: Damaso Barrios Ormeno, Antofagasta (CL); Clement Chilowa Chibwana, Antofagasta (CL); Johannes Mattheus Strauss, Antofagasta (CL); Gary Vernon Rorke, Christchurch (NZ)

(73) Assignee: BHP Chile Inc, Santiago (CL)

( * ) Notice: Subject to any disclaimer, the term of this patent is extended or adjusted under 35 U.S.C. 154(b) by 294 days.

(21) Appl. No.: 16/955,936

(22) PCT Filed: Dec. 20, 2018

(86) PCT No.: PCT/IB2018/060418
§ 371 (c)(1),
(2) Date: Jun. 19, 2020

(87) PCT Pub. No.: WO2019/123362
PCT Pub. Date: Jun. 27, 2019

(65) Prior Publication Data
US 2021/0207245 A1 Jul. 8, 2021

(30) Foreign Application Priority Data

Dec. 21, 2017 (ZA) ................................ 2017/08731
Jan. 18, 2018 (ZA) ................................ 2018/00345

(51) Int. Cl.
*C22B 15/00* (2006.01)

(52) U.S. Cl.
CPC ...... *C22B 15/0084* (2013.01); *C22B 15/0008* (2013.01); *C22B 15/0069* (2013.01)

(58) Field of Classification Search
CPC ............ C22B 15/0084; C22B 15/0008; C22B 15/0069; C22B 15/0071; Y02P 10/20
(Continued)

(56) References Cited

U.S. PATENT DOCUMENTS 6,926,753 B2    8/2005  Faine et al.
2003/0230171 A1  12/2003  Imamura et al.
(Continued)

FOREIGN PATENT DOCUMENTS

EP      3 246 420 A1   11/2017
WO  WO 2014/030048 A1   2/2014
(Continued)

OTHER PUBLICATIONS

Written Opinion of the International Searching Authority for PCT/IB2018/060418 dated Mar. 21, 2019, 6p.
(Continued)

*Primary Examiner* — Brian D Walck
*Assistant Examiner* — Danielle Carda
(74) *Attorney, Agent, or Firm* — Crowell & Moring LLP

(57) ABSTRACT

A method of controlling the acid balance in a high chloride heap leach process to maximise the copper dissolution in a cure step and to increase overall copper recovery which include an agglomeration stage in which acid and process solutions are combined with the ore prior to stacking to form a heap followed by a cure phase to leach a portion of the copper in the ore in the heap followed by an irrigated leach phase in which the remaining copper minerals are leached and copper is recovered from a pregnant leach solution by a solvent extraction step followed by an electrowinning step wherein the acid concentration in the pregnant leach solution which reports to the solvent extraction step is less than 10 g/L to allow effective copper recovery from the pregnant leach solution in the solvent extraction step.

14 Claims, 14 Drawing Sheets

(58) Field of Classification Search
USPC .......................................................... 75/743
See application file for complete search history.

(56) References Cited

U.S. PATENT DOCUMENTS

| 2015/0232963 A1 | 8/2015 | Martinez et al. |
| 2016/0258036 A1 | 9/2016 | Rautenbach |
| 2017/0335428 A1 | 11/2017 | Gutiérrez et al. |
| 2017/0349972 A1 | 12/2017 | Rorke |

FOREIGN PATENT DOCUMENTS

| WO | WO 2015/059551 A1 | 4/2015 |
| WO | WO 2016/094956 A1 | 6/2016 |

OTHER PUBLICATIONS

International Search Report for PCT/IB2018/060418, dated Mar. 21, 2019, 3p.
International Preliminary Report on Patentability for PCT/IB2018/060418 dated May 26, 2020, 10p.
U.S. Appl. No. 16/955,948, filed Jun. 19, 2020.

ACID BALANCE IN A CHLORIDE HEAP LEACH

This application is a National Stage application of International Application No. PCT/IB2018/060418, filed Dec. 20, 2018, the entire contents of which are incorporated herein by reference.

This application claims priority under 35 U.S.C. § 119(a) to 1) South African Patent Application No. 2017/08731, filed on Dec. 21, 2017, and 2) South African Patent Application No. 2018/00345, filed on Jan. 18, 2018, the entire contents of each of which are incorporated herein by reference.

BACKGROUND OF THE INVENTION

Field of the Invention

This invention relates to the chloride leaching of copper ores.

Description of the Related Art

Heap leaching of low grade copper sulfide ores using acid sulfate solutions with bacteria is an established commercial process applied world-wide.

Recently methods of chloride leaching have been developed allowing leaching of copper sulfide ores, including chalcopyrite, at high potentials without the use of bacteria. WO2014/030048 and WO2015/059551 teach that the use of high chloride concentrations (100 to 230 g/L chloride) overcomes the passivation of chalcopyrite, allowing operation at solution oxidation potentials above 700 mV versus SHE (standard electrode system), resulting in increased rates of chalcopyrite leaching giving higher copper recoveries.

In practice heap leaching of copper ores in chloride solutions at a commercial scale is limited by constraints which, if ignored, will limit the economic viability of the process. Heap leach operations utilise different configurations to optimise copper concentrations in the respective circuits. This is done to minimise capital costs for solvent extraction construction, and operation, and in order to reduce copper loss. Heap leach circuits vary from systems with single ponds, to systems with multiple ponds that include what is known as ILS (intermediary leach solution) ponds. These are included as an intermediary step in the process to increase the copper tenor of the PLS (pregnant leach solution).

In the high saline leaching of copper sulfide minerals there is presolubilization of copper and a reduction in gangue acid consumption through either a pre-leach stage (as disclosed in WO2016/094956) or a rest step (as disclosed in WO2015/059551), where ore and solution are left in contact for a period of time to promote dissolution of reactive ore minerals before continuous irrigation of the heap. Thereafter, in each case, there is an irrigated leach phase which calls for circuit acid balance and the maintenance of an acceptable lower acid concentration in the PLS compared to more conventional acid sulfate systems. The lower acid concentration is necessary in order to ensure a stable operating process with minimal solution purge from the process circuit.

Definitions

The following expressions, as used in this specification, have the meanings which are described unless the context clearly indicates otherwise:

Ore and grade: An ore is a type of rock that contains sufficient minerals with important elements including metals that can be economically extracted from the rock (Ref 1). Ore refers to the mined material and not a concentrate which is produced by selective separation and recovery of the ore minerals from the rock, or gangue components of the ore. The material may be treated as mined i.e. as run-of-mine (ROM) ore, or after crushing, as crushed ore. Crushing the ore increases the exposed surface area of the ore minerals and thereby improves the rate of extraction of contained metals by a process of heap leaching.

Conventional ore agglomeration: In a process of heap leaching it is common practice to carry out agglomeration of crushed ore followed by a curing stage after heap construction. The crushed ore particles are mixed with process solution and acid in an agglomerating drum to a fixed moisture content. The agglomeration step results in fine particles adhering to coarser particles by the formation of liquid bridges created by the action of surface tension. A curing step following construction of a heap allows acid added during ore agglomeration to react with the ore minerals and promotes the dissolution of metals from the ore minerals during subsequent irrigation of the heap. A conventional agglomeration process results in the formation of uniform particle agglomerates where fine particles are adhered to coarser particles throughout the heap creating a uniform and permeable ore bed thereby promoting heap irrigation flow and dissolution of metals from the ore minerals. In the treatment of ores where it is difficult to form uniform and stable particle agglomerates, binding agents may be added during the agglomeration step to bind particles to each other. Typical binding agents for acid leaching of ores are based on organic polymers, such as polyacrylamides.

Technical Factors Relevant to the Current Invention

Purpose of ore agglomeration in the chloride heap leaching of copper: The method of heap leaching of copper described hereinafter may use an agglomeration process to mix crushed ore particles with the active leaching reagents of sulfuric acid, chloride, copper and iron. The mixing of reagents with the ore to create a surface solution film around the ore particles is the primary advantage of an agglomeration step in the method of heap leaching of copper as described herein. The formation of ore agglomerates and reaction of acid with ore minerals, as applied in conventional ore agglomeration, are of secondary importance. The process of ore agglomeration in the method of heap leaching of copper hereinafter described allows the reagents to be evenly distributed in a solution film around all the ore particles. The solution film creates a large reactive surface area around the ore particles. Following construction of the heap with the agglomerated ore and during an initial rest period under aeration, the mass transfer of oxygen from air to the ore particles surfaces is greatly increased through the surface films surrounding the ore particles and metal dissolution from the ore minerals is greatly enhanced due to rapid generation of the oxidants Fe(III) and Cu(II) by the reaction of dissolved oxygen with Cu(I). The enhanced surface areas available for mineral oxidation and the supply of acid promote heat generation and an increase in the ore temperature during ore agglomeration.

Ore wetting Cycle: After the ore agglomeration step is completed, the chloride leach may include five stages, namely: (a) curing, (b) wetting, (c) irrigation, (d) rest or drainage, and e) washing and final draining stages. The ore wetting stage is carried out to prevent channelling of irrigation solution through the heap. After curing, the ore is intermittently irrigated with the raffinate solution, or for a period of 10 to 50 days, typically 20 days. During this period, the irrigation time is steadily increased from 30 minutes to 9 h while incorporating a series of curing or rest stages as presented in Table A. Table A shows that for a 12 h irrigation cycle, the heap is on the first day irrigated for 30 minutes in the morning and then the ore is allowed to cure for 23.5 h. From day 2 through to day 5, the heap is irrigated for 30 minutes in the morning and again repeated after 12 hrs of curing for the same period of time. This process is repeated with corresponding increases in irrigation/curing cycle times until day 20 when 24 cycles are conducted amounting to 12 hrs of irrigation and 12 hrs of curing.

TABLE A

|  | Day | Cycle Irrigation time × Curing time | No of cycles/ day | Total irrigation time (hrs) |
|---|---|---|---|---|
| Wetting | 1 | 0.5 × 23.5 | 1 | 0.5 |
| Period | 2 | 0.5 × 11.5 | 2 | 1 |
|  | 3 | 0.5 × 11.5 | 2 | 1 |
|  | 4 | 0.5 × 11.5 | 2 | 1 |
|  | 5 | 0.5 × 11.5 | 2 | 1 |
|  | 6 | 0.5 × 7.5 | 3 | 1.5 |
|  | 7 | 0.5 × 7.5 | 3 | 1.5 |
|  | 8 | 0.5 × 7.5 | 3 | 1.5 |
|  | 9 | 0.5 × 7.5 | 3 | 1.5 |
|  | 10 | 0.5 × 3.5 | 6 | 3 |
|  | 11 | 0.5 × 3.5 | 6 | 3 |
|  | 12 | 0.5 × 2.5 | 8 | 4 |
|  | 13 | 0.5 × 2.5 | 8 | 4 |
|  | 14 | 0.5 × 2.5 | 8 | 4 |
|  | 15 | 0.5 × 1.5 | 12 | 6 |
|  | 16 | 0.5 × 1.5 | 12 | 6 |
|  | 17 | 0.5 × 1.0 | 16 | 8 |
|  | 18 | 0.5 × 1.0 | 16 | 8 |
|  | 19 | 0.5 × 1.0 | 16 | 8 |
|  | 20 | 0.5 × 0.5 | 24 | 12 |

The incorporation of the wetting stage into the operation is important because it minimises preferential flows of the raffinate solution once irrigation commences. It can also be used to replenish the acid to the ore prior to irrigation; this is important especially for more compact ores that do not generate fines during preparation and do not absorb enough moisture during agglomeration. Acid is critical to the process and should be supplied in sufficient amounts as demanded to meet the consumption by gangue mineral and copper mineral dissolution.

The complete heap leach cycle of five stages may include the following periods, by example but not limited to:
Initial ore curing or rest step—45 days;
Ore wetting—20 days;
Heap irrigation—360 days;
Drain step—2-20 days;
Rinsing/washing—20 days;
Draining—30 days;
Total heap leach cycle—495 days.

The heaps are aerated during the heap leach cycle from the initial ore curing step until completion of the heap irrigation step. The aeration may be continued during the rinsing step and final drainage of the heap in order to promote high oxidation potentials in the circuit solutions. The aeration rate is typically in, but not limited to, the range 0.05 to 2.0 Nm$^3$/h·m$^2$ of heap area for a 6 m heap and preferably in the range 0.1 to 0.4 Nm$^3$/h·m$^2$ and about 0.45 Nm$^3$/h·m$^2$ for leaching copper sulfide ores in a high chloride acid solution. The aeration rate is determined by the oxygen demand of the minerals to be leached and the height, or mass, of ore loaded in a heap.

Acid Control

In a high salinity leach circuit, the process starts with acid agglomeration and is followed by a cure and rest phase. In these periods acid is consumed by gangue acid reactions and by the solubilisation of copper from copper sulfide minerals such as chalcocite, covellite and chalcopyrite as per the general reaction shown as rxn 1.

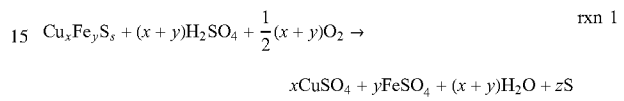

$$Cu_xFe_yS_s + (x+y)H_2SO_4 + \frac{1}{2}(x+y)O_2 \rightarrow \quad \text{rxn 1}$$

$$xCuSO_4 + yFeSO_4 + (x+y)H_2O + zS$$

Where x, y and z are:

| Mineral | x | y | z |
|---|---|---|---|
| Chalcocite | 2 | 0 | 1 |
| Covellite | 1 | 0 | 1 |
| Bornite | 5 | 1 | 4 |
| Chalcopyrite | 1 | 1 | 2 |

In the cure period, temperature becomes elevated and reactant concentrations are high, so this is a favourable time for leaching as both factors drive kinetics. This reduces the overall time that the ore needs to be leached and saves capital and operating costs. In order for rxn 1 to proceed as far as possible, sufficient acid has to be supplied as it is a necessary reactant (as per rxn 1). In this cure/rest phase, acid is also being consumed by reactions with acid-soluble gangue minerals. The rate of these reactions is also promoted by the elevated temperature. In order to promote copper leaching, sufficient acid is required to satisfy these competing gangue reactions.

At the end of the cure/rest period, typically, (but not limited to), up to 50% of the copper that is likely to be dissolved in the process has been solubilised and most of the readily soluble gangue minerals have been leached. In the subsequent irrigated leach phase, this copper, together with the other 50% of the copper that leaches, is reclaimed from solution by solvent extraction (SX) combined with electrowinning (EW). This process generates 1 mol of acid for every mol of copper plated in EW. This acid returns to the heap leach via solvent extraction.

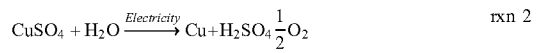

$$CuSO_4 + H_2O \xrightarrow{Electricity} Cu + H_2SO_4 \frac{1}{2}O_2 \quad \text{rxn 2}$$

Thus during the irrigated leach stage, where all the solubilised copper is recovered, there may be net positive acid production. Table 1 illustrates the difference, for different types of minerals, in the acid demand for the leaching of the 50% additional copper and the acid generation in the SX/EW stage for the combined soluble copper.

TABLE 1

| If residual mineral after cure is: | Mols of acid to leach per ½ mol Cu leached during irrigation phase (rxn 1) | Mols of acid generated in EW for each mol of Cu plated (rxn 2) | Net acid production mol per mol Cu plated |
|---|---|---|---|
| Covellite/chalcocite | 0.5 | 1.0 | 0.5 |
| Bornite | 0.6 | 1.0 | 0.4 |
| Chalcopyrite | 1.0 | 1.0 | 0.0 |

The result is that if all residual copper is chalcopyrite then, in this situation, the acid balance is neutral otherwise, for all other copper sulfides, it is acid positive.

The neutrality of the balance for chalcopyrite is not true in practice either. This is because for every mol of copper that is leached, one mol of ferrous is leached from the chalcopyrite as well. For example, low head grades would equate to around 0.4% copper. If it is considered that in this irrigation stage around 30% of the copper is assumed to solubilise, then even at such low grade, this is equivalent to 1.2 $kg_{Cu}/ton_{ore}$. This would generate 1.1 $kg_{Fe(II)}/ton_{ore}$. The only exit from this process for such soluble iron is through the residual moisture in the leached ore (ripios) when it is removed from the leach pile and sent to the ripios dump.

Typical moisture content is about 10% (v/m). This means that at equilibrium the iron in solution would have to be at 11 g/L for the amount generated to equate to the amount exiting. The process in WO2015/059551 envisages a wash stage at the end of the leach. This wash will typically retain 70% of the dissolved salts. This is an optimisation to reduce the amount of sodium chloride required for the process, but it also means that the equilibrium concentration of iron would need to be 36 g/L, for the amount generated to equal the amount leaving the process. In testing, solubility constraints have shown that the total soluble iron in this process equilibrates at around 5 g/L (see FIG. 1). After wash, the discharge concentration would be 1.5 g/L (or 0.15 $kg/t_{Ore}$). This means that of the 1.1 $kg/t_{Ore}$ of the iron generated, 86% of the iron would be expected to precipitate. The iron is precipitated in the circuit by three precipitation reactions:

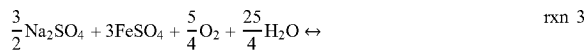

rxn 3

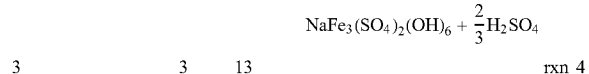

rxn 4

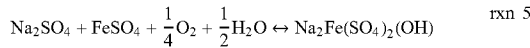

rxn 5

The ferrous converts to ferric and reacts to form precipitates as per reactions 3, 4 & 5. Reactions 3 and 4 are the formation of jarosites. These reactions are net acid generating and account for the overall net acid generation from the dissolution of chalcopyrite, in the irrigated phase of heap leaching, when copper is recovered by a combination of solvent extraction (SX) and electrowinning (EW).

Reaction 5 is the formation of metasideronatrite. The net reaction for this does not produce acid. The split between these three reactions is difficult to predict. It is both equilibrium and rate dependent. In the case of potassium jarosite, the split depends on how much potassium is leached into solution from other minerals that dissolve in the process (example sericite).

With a different ore, the amounts of jarosite that formed when large ore samples in cribs (2 m×2 m square columns) were subjected to the high chloride heap leach process are shown in Table 2.

TABLE 2

Jarosite in ripios residue post leaching of ore from open circuit testing

| CRIB test number and ore identifier | Percentage jarosite measured in ripios |
|---|---|
| Crib 1-A | 0.5 |
| Crib 2-B | 0.4 |
| Crib 3-C | 1.4 |
| Crib 4-D | 1.0 |
| Crib 5-E | 1.0 |
| Crib 6-F | 1.2 |
| Average | 0.9 |

The tests were carried out in "open circuit" i.e. a solution is passed once through a test column and is not recycled. This generally leads to a lower precipitate formation because the iron concentration in the feed liquor is at most at the saturated concentration (approximately 5 g/L) and there is only a small amount of additional total dissolved salts (TDS) added per pass through a column, so the 0.9% jarosite represents a minimum amount of iron that may be precipitated from solution.

The 0.9% jarosite approximately equates to 3.3 $kg/t_{ore}$ of precipitated iron. This is ~3× higher the amount of iron generated from chalcopyrite alone. Some of this iron comes from leaching iron-containing gangue minerals. In the case of jarosite precipitation, for each mol of ferrous that is oxidised and precipitated, ½ mol of acid ($H_2SO_4$) is generated; hence this amount of jarosite produces 3 $kg/t_{ore}$ of acid. The net effect is that additional iron generated from chalcopyrite is likely to report to some degree to jarosite and hence the acid balance shown in Table 1 for chalcopyrite, instead of being zero, would in fact be positive, due to acid generated as a result of precipitation of leached iron as jarosite.

It has been established that with a sufficiently high copper dissolution in the initial cure phase, subsequent further dissolution of copper from sulfide minerals and recovery through solvent extraction combined with electrowinning (EW) is likely to be acid-generating. The excess acid arises from the following:

1. an imbalance between the acid demand for leaching the additional copper mineral in the irrigation phase compared to the total EW acid make for the copper leached during the cure and irrigation phase, if the copper minerals are chalcocite and covellite;
2. an imbalance between the acid demand for leaching the additional copper mineral in the irrigation phase compared to the total EW acid make for the copper leached during the cure and irrigation phase as well as some iron precipitation (jarosite) if the copper mineral is bornite; and
3. jarosite precipitation if the copper mineral is chalcopyrite.

The application to the ore referred to in connection with FIG. 1 is slightly different for two reasons. The high gangue acid consumption negates the benefits achieved by the cure/rest step and the ore contains uranium. Uranium solubilises with high chloride in solution (e.g. 150 g/L), but it is very difficult to recover from solution because of the high chloride and the high concentration of iron chloride complexes. This results in the need for an irrigated pre-leach stage. This takes at least 200 days to complete and also leaches a substantial amount of copper, as well as depleting the readily soluble gangue minerals. The second part of the irrigated leach, at high chloride concentration, results in a high copper dissolution, due mainly to dissolution of secondary copper sulfides (covellite, bornite) which are the dominant copper minerals in parts of the ore. Jarosite formation and the acid produced from leaching and electrowinning (EW) the secondary copper sulfide minerals (as per Table 1), result in high acid generation. That, together with a reduction in acid soluble gangue minerals from the pre-leach, result in a high acid tenor in the PLS, as is predicted for a high chloride leach process. This creates difficulties for soluble copper recovery as discussed hereinafter.

Copper solvent extraction is sensitive to acid concentration. This is because such extraction works on an equilibrium between copper and acid ($H^+$). Copper loads on the organic under conditions where the aqueous phase in contact with the organic has a high copper tenor with low acid. The copper is stripped off the organic by contact with an aqueous phase that has high acid. This sensitivity becomes more pronounced under very high chloride concentrations (100 to 150 g/L) because of the substantially increased activity of the proton ion ($H^+$) at elevated chloride concentrations.

In low chloride environments, it is optimal to aim for an extraction per pass of around 7 g/l Cu. This results in an organic to aqueous flow of around 1:1. The amount of extractant in the organic is such that the organic viscosity is moderate and good phase disengagement can be achieved. This gives good operability, low organic loss (opex) and a minimum capital spend. In the circumstances, a typical PLS acidity is 2-4 g/l and the raffinate concentration of acid from the acid transfer is 12-15 g/L.

In a high chloride heap leach operation (100 g/L to 180 g/L, typically), 7 g/l of copper transfer is very difficult to achieve because of the acid transfer to raffinate, and increased proton activity. pH is a direct measure of proton activity. At 20 g/l chloride and 12 g/l free acid the measured pH is ~1, whilst at equivalent acid but 150 g/l chloride the measured pH is ~0.2.

Targets for copper transfer in a high chloride leach process need to be 5 g/l or less, combined with very low acid in the PLS. At a 5 g/l copper delta this means that the size of the SX circuit would have to 40% larger for the same copper transfer duty as for 7 g/L. This translates to increased capital and operating costs. This problem rapidly worsens if the acidity increases in the PLS under high chloride conditions.

An object of the invention is to provide a method for chloride leaching of copper bearing ores whereby the acid concentration in the circuit is controlled in order to achieve efficient copper recovery from solution by solvent extraction (SX) and to minimise, or eliminate, solution purge from the circuit, an occurrence which increases copper loss and operating costs.

SUMMARY OF INVENTION

From the aforegoing it is clear that it is important to control the acid concentration in the heap leach process circuit to achieve efficient copper recovery from solution by solvent extraction. In a high chloride heap leach process (100 to 180 g/L) efficient copper recovery from solution by solvent extraction is dependent on maintaining a low acid concentration in the PLS. It has been demonstrated by experiment that the acid concentration in the PLS, which reports to a solvent extraction process, should be less than 10 g/L, preferably lower than 7 g/L and more preferably lower than 5 g/L.

It is an advantage not to restrict acid addition to the ore agglomeration step, so that copper mineral dissolution is not limited by acid, and so that the copper dissolution achieved during ore curing is a maximum.

A heap leach process circuit configuration may be adopted in which leaching is carried out in a plurality of heaps, or sections of a heap, in order to maximise the amount of acid which is consumed by the residual acid soluble gangue minerals and thereby control the acid concentration in the PLS.

If two or more leach stages are used then preferably the leach liquor is counter-current circulated to the loading of ore to the heaps and removal of ore from the heaps.

The aforementioned approach relies on the fact there are always slow leaching gangue minerals such as hematite and sericite remaining. The rate of dissolution of such minerals is generally proportional to the acid tenor. These minerals are massive in abundance and their extent of dissolution is low, so the minerals are not appreciably diminished over the leach cycle.

In broad terms the aforementioned objective can be achieved by taking into account the nature of the acid soluble gangue minerals in the heap and the amount of acid required for copper mineral dissolution, and responsive thereto, adjusting the addition of acid during an agglomeration step. This allows the recovery of copper in the cure step to be maximised.

The amount of acid which is required during agglomeration may be calculated taking into account the rate of reaction of each gangue mineral and the acid which is required for dissolution of contained copper minerals, i.e. the amount of acid which is added is optimally controlled to satisfy the demand in the cure phase.

The copper leached in the cure step reports to the circuit PLS, and acid returned by extraction of this copper from the PLS in the SX step is returned to the raffinate used for heap irrigation during the leach cycle. This process may result in excess acid in the raffinate creating a positive acid balance. The excess acid may be removed by gangue mineral dissolution in the heap leaching cycle by adoption of a heap leach process circuit configuration in which leaching is carried out in a plurality of heaps, or sections of a heap, using a counter-current method of circulating leach liquor to the loading of ore to the heaps and removal of ore from the heaps.

The amount of acid which is added to the raffinate is thus dependent on the amount of acid added during agglomeration. Similarly, the amount of acid added during agglomeration is dependent on the acid added to the raffinate to meet the requirement for copper dissolution in the presence of the gangue, during the leach cycle.

The dissolution of copper during agglomeration and in the subsequent rest, or cure, period, may be restricted by limiting the amount of acid added during ore agglomeration, thereby ensuring a greater extent of acid consumption during the irrigated phase, and avoidance of excess acid production during the leach cycle following copper removal and return of acid to the raffinate in the SX extraction step.

The first PLS collected from initial irrigation of the cribs following ore curing may have a high acid content (>10 g/L) and a high copper content (>20 g/L). If so, the first PLS may be used in the ore agglomeration of subsequent heaps prior to the cure phase. These values are exemplary and are non-limiting.

As an alternative to the aforementioned processes it is possible to reduce the amount of washing at the end of a leach cycle in order to increase the amount of acid removed with the leached ore (ripios). This however is less preferable for soluble losses of copper and sodium chloride are increased. This implies increased revenue losses and higher operating costs.

BRIEF DESCRIPTION OF THE DRAWINGS

Two embodiments of the invention are further described herein, respectively with reference to FIGS. 2 to 7, and FIGS. 8 to 12, of the accompanying drawings wherein.

DESCRIPTION OF PREFERRED EMBODIMENTS

A first embodiment of the invention is hereinafter described with reference to FIGS. 2 to 7 while a second embodiment of the invention is described hereinafter with reference to FIGS. 8 to 12.

Embodiment 1—Multistage Heap Leach Operation

Figure 1:
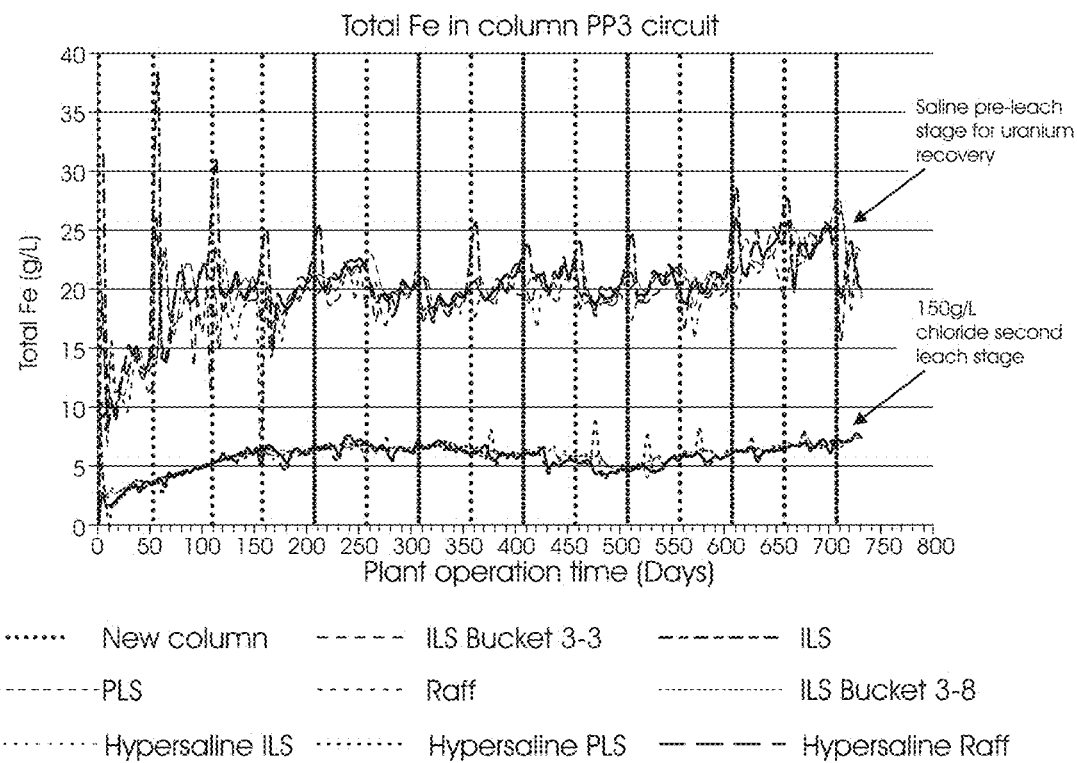
Figure 2:
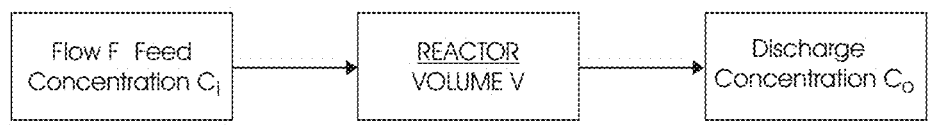
FIG. 2 is a generalized diagram of a reactor.

FIG. 2 shows a typical reactor 10. A mass balance for a reactant C can be carried out over the reactor. For simplicity, it is assumed that volumetric flows in (12) and out (14) are equal. In addition, as real heaps are surprisingly well-mixed, it is assumed for simplicity that the concentration of reactant within the reactor 10 is the same as in a discharge from the reactor (i.e. a well-mixed reactor).

The mass balance over reactant C is as follows:

In=out+lost in reaction $$F \cdot C_i = F \cdot C_o + rV$$

Where: F is the flow rate; $C_i$ is the inlet concentration; $C_o$ is the outlet concentration; V is the reactor volume; and r is the rate of acid use, which in this case, as defined earlier, is proportional to the acid concentration $C_o$.

Thus $r=kC_o$, where k is a rate constant for the mineral concerned.

The equation can be re-written as:

$$F \cdot C_i = F \cdot C_o + k \cdot C_o \cdot V$$

V/F has a unit of time and is known as the average retention time, or τ.

The equation can be rewritten as follows:

$$\frac{C_o}{C_i} = \frac{1}{(1+k\tau)} \quad (A)$$

The factor k is a constant and τ is a constant for a fixed heap bed at fixed irrigation rate per unit area. This means the percentage conversion (Co/Ci) of the inlet concentration of acid is fixed irrespective of the inlet concentration.

Figure 3:
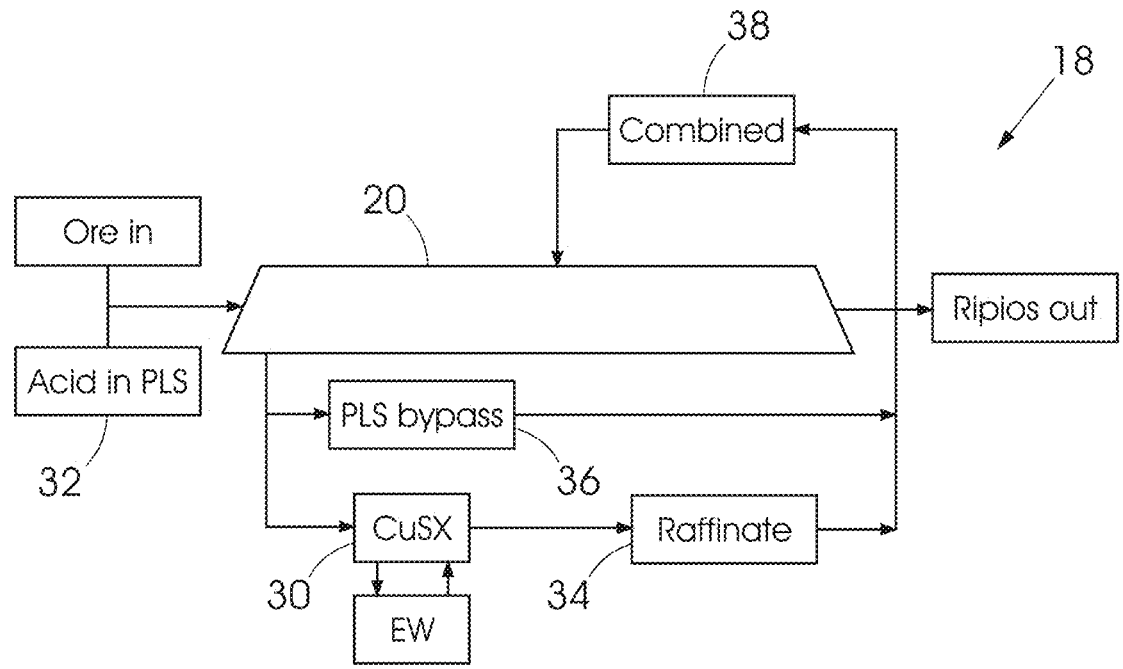
FIG. 3 shows a standard circuit in a heap leach process.

FIG. 3 is a flowsheet of a standard heap leach circuit 18 wherein about 50% of the PLS is bypassed for CuSX optimisation. In FIG. 3 a single heap 20 is used. By way of contrast, in the process 24 shown in FIG. 4, there are two heaps 20A and 20B respectively.

In both processes (FIG. 3 and FIG. 4) the same amount of copper is transferred to the CuSX stage (30)—this transfer of copper elevates the acid tenor by 7 g/L.

In the flowsheet of FIG. 3, the acid in the PLS 32 is set at y g/L. The raffinate 34 then contains y+7 g/L of acid. The bypass 36 and raffinate 34 are recombined (38) to give an average acid concentration of (2y+7)/2. This is passed over the heap 20 where the conversion is assumed to be 50%. This conversion would occur, irrespective of the acid concentration, as shown by equation A.

At steady state the process 18 must balance, hence:

y (in PLS)=50%·(2y+7)/2

Thus y=3.5 g/L of acid.

The PLS is split in half in the example in FIG. 3. This is for ease of comparison to the example in FIG. 4. If the PLS were not split, it would still result in the same PLS acid concentration. However the acid increase in the raffinate would be 3.5 g/l.

Figure 4:
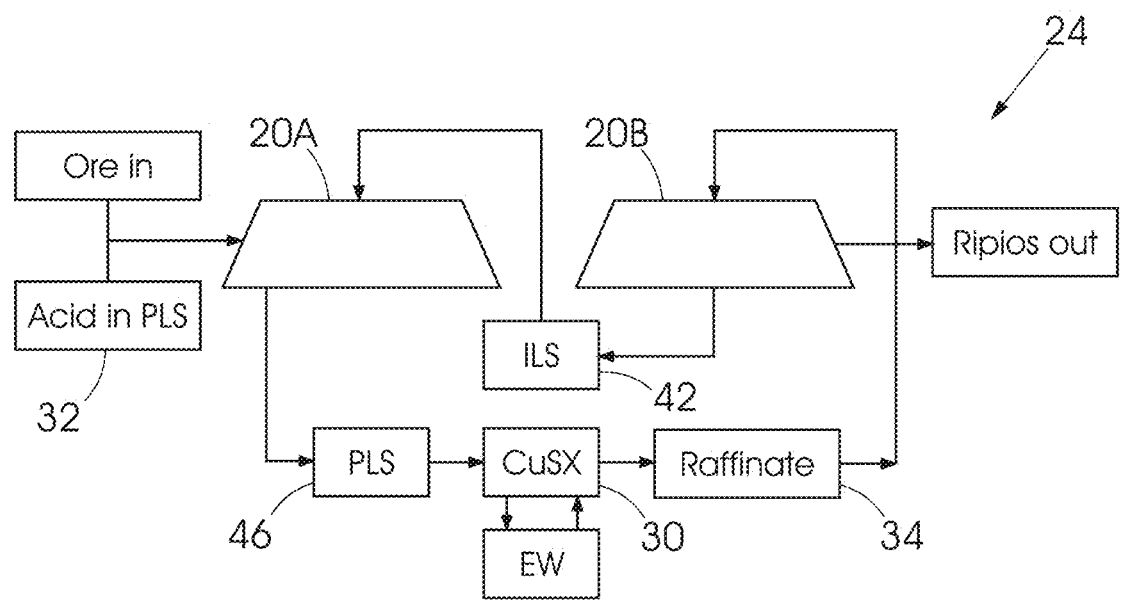
FIG. 4 schematically depicts a multi-stage heap leach process operated in accordance with a first embodiment of the invention.

In the flowsheet of FIG. 4, the acid in the PLS (32) is also set at y g/L. The PLS is already ½ that of the example in FIG. 3. The PLS (32) reports to CuSX (30) and 7 g/L of acid is transferred to the liquor. The resultant liquor (raffinate) 34 then contains y+7 g/L of acid. This is passed over the heap 20B where the conversion is assumed to be 50%. It is then passed over the heap 20A where a further 50% conversion occurs.

At steady state the process (24) must balance, hence:

y (in PLS)=50%·50%·(y+7), and

Thus y=2.3 g/L of acid

If the process were to be extended to 3 stages, then y(in PLS)=50%·50%·50% (y+10.5), and and y=1.5 g/L of acid.

Figure 5:
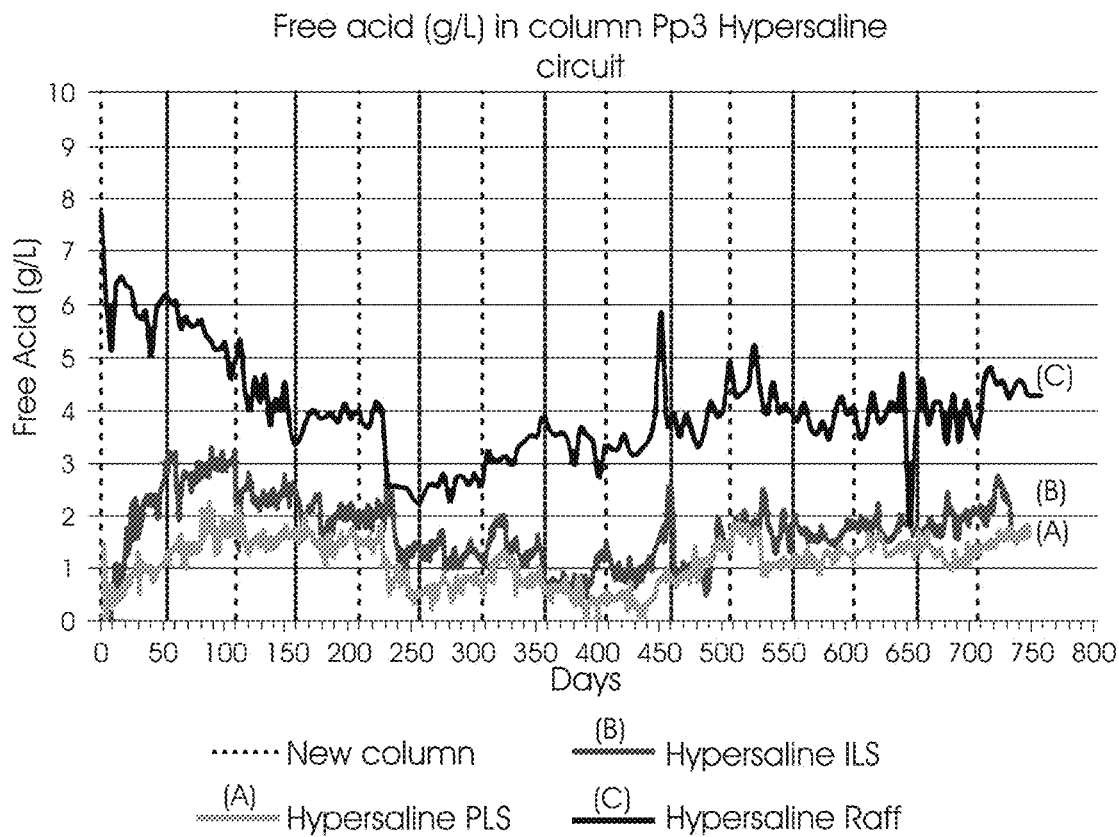
FIG. 5 reflects curves of free acid profiles against time for the parameters of PLS, ILS and rafinate.

Thus, by operating the process with two or more ILS 42 stages, the amount of acid in the PLS 46 reporting to the copper solvent extraction stage can be significantly reduced without a detrimental impact on the process. An example of the effectiveness of the process can be seen by the change in free acidity for the hypersaline section (100 to 150 g/L chloride) of a pilot plant as shown in FIG. 5.

Figure 6:
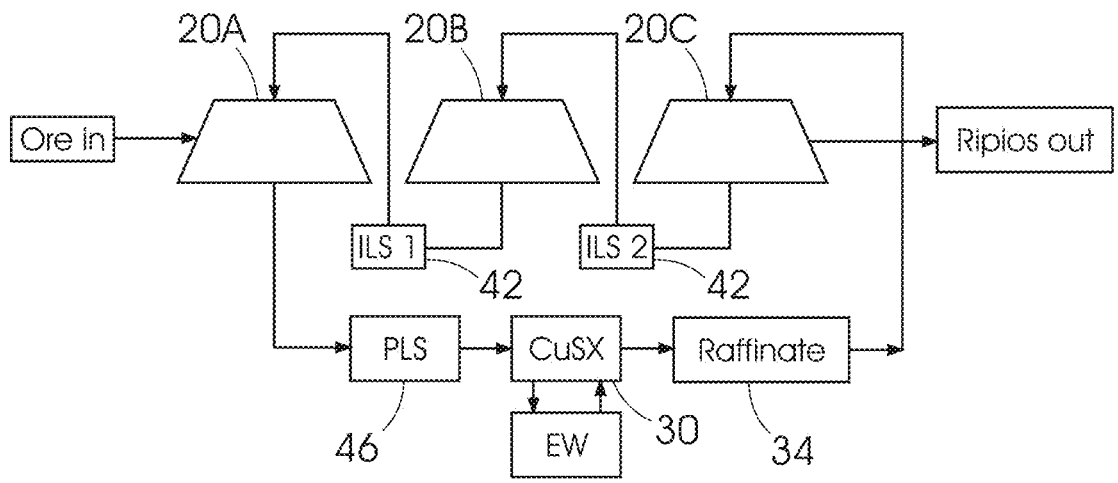
FIG. 6 illustrates a process flow according to the invention with counter-current circulation.
Figure 7:
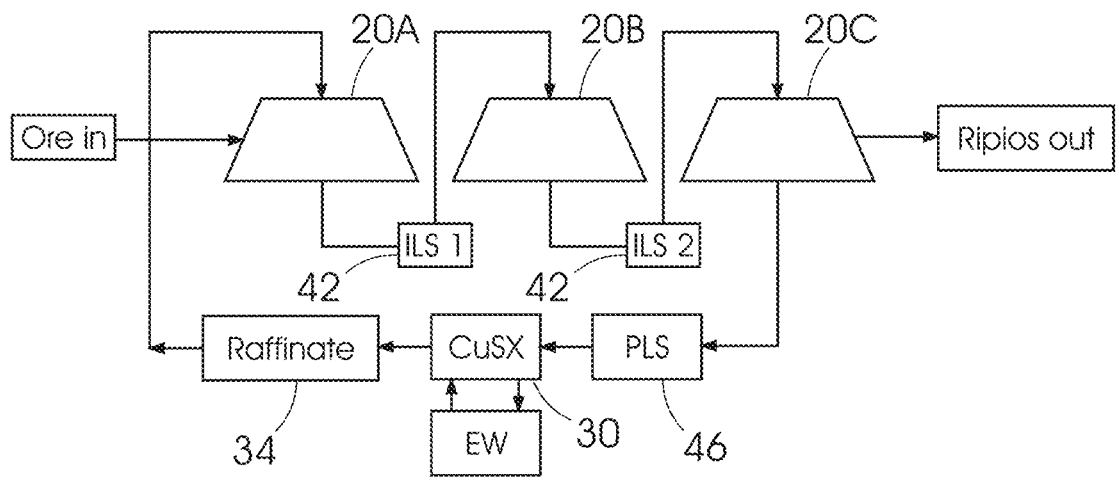
FIG. 7 is similar to FIG. 6 but with co-current circulation.

The multistage implementation of the process of the invention can be configured such that the process flow is counter-current with the ore, or co-current thereto, as shown, respectively, in FIG. 6 and FIG. 7.

The counter-current operation has an advantage over the co-current operation in that the final stage of the heap 20C is irrigated with the raffinate (34). The raffinate has the lowest copper tenor and hence this minimises soluble copper loss to the ripios.

Embodiment 2: Control and Optimisation of Acid Added During Agglomeration

Excess Acid Control

In any of the circuits shown in FIGS. 3 to 7, (as examples), PLS (32) or raffinate (34) can be circulated back to the agglomerator to provide soluble copper, iron and acid. The acid is required in the ore agglomeration to reduce the pH in the cure/rest phase, and to generate oxidant for copper sulfide leaching (rxn 1). Iron and copper are required as oxidants. The effectiveness of the oxidants increases with concentration.

Figure 8:
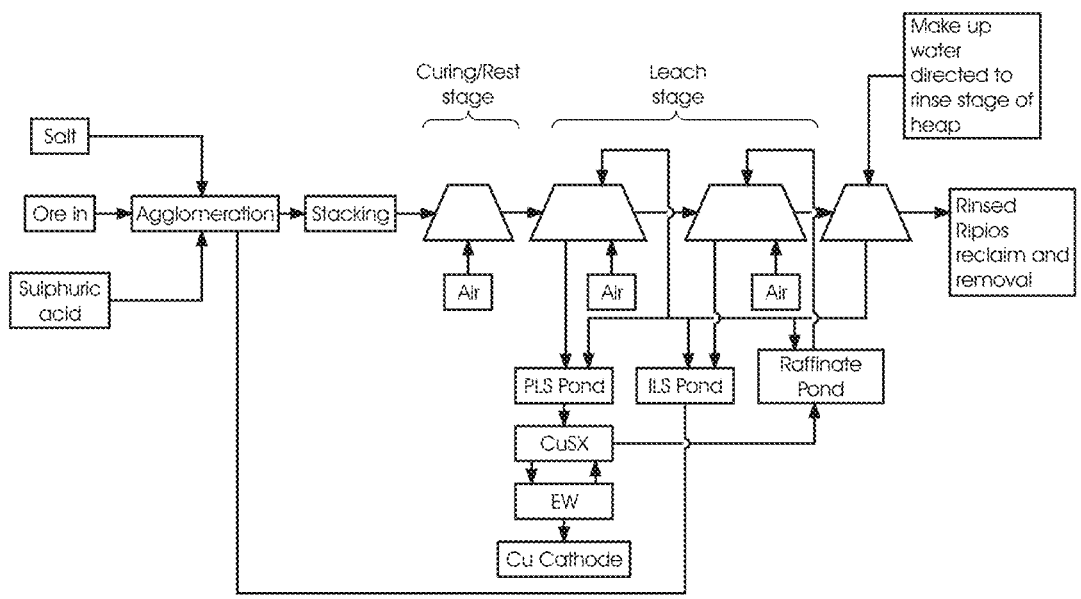
FIG. 8 depicts a general flow diagram for a process operated in accordance with a second embodiment of the invention.

A typical simplified general flow diagram for the process is shown in FIG. 8. This depicts a two stage process wherein the solution for agglomeration is taken from the PLS.

Figure 9:
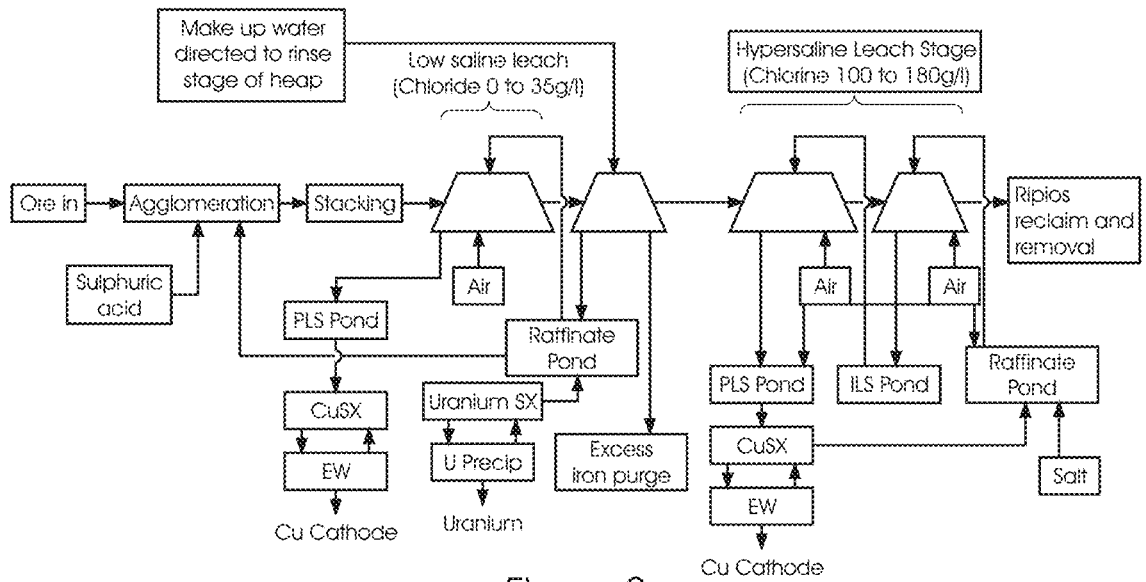
FIG. 9 shows the process of FIG. 8 in more detail.

FIG. 9 shows the process of FIG. 8 in more detail.

It has been found that upon irrigation of the ore bed, following the rest period and ore curing, the first drainage solution or initial PLS contains exceptionally high concentrations of copper, iron and acid. A further optimisation of the process is to utilise this initial PLS or "first flush" in the ore agglomeration step firstly, to increase the levels of oxidants (soluble copper and iron) in the subsequent cure/rest stage, and, secondly, in line with the acid strategy, if there is excess acid, then the amount of fresh acid added to the agglomeration of subsequent ore can be discounted by the acid. This helps to mitigate against excess acid in the leach phase.

Figure 10:
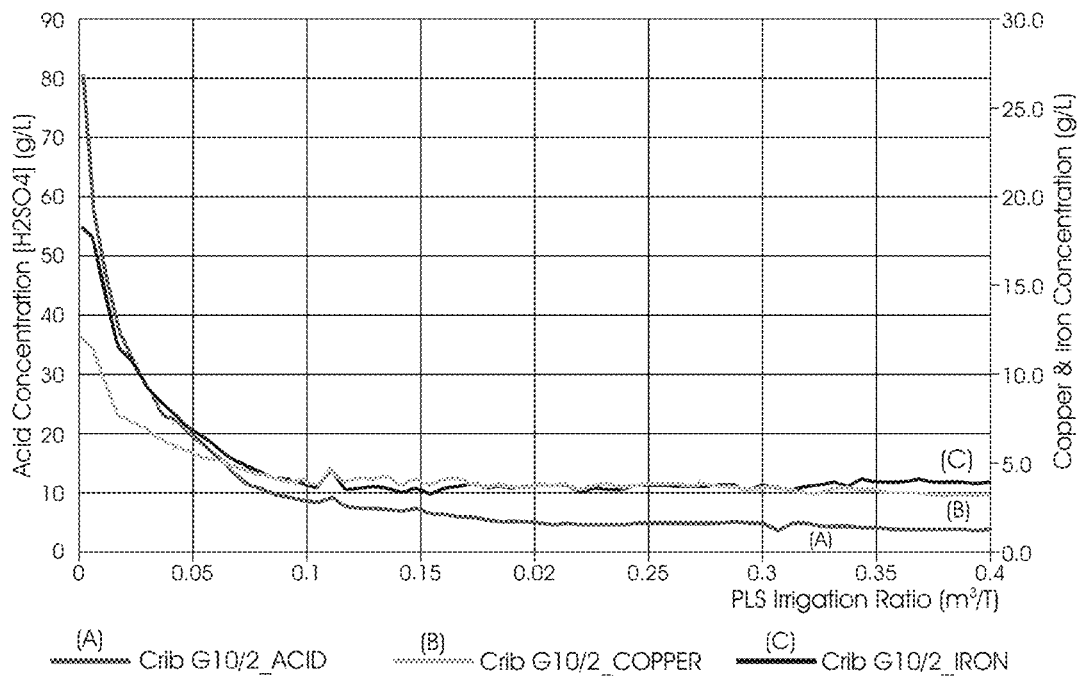
FIG. 10 graphically reflects PLS concentration profiles showing acid, copper and iron concentrations as a function of the PLS irrigation ratio at an irrigation rate of 3 L/h·m$^2$.

This is illustrated by the results which are presented in FIG. 10, for a 2 m×2 m×8 m crib test at a pilot plant used to treat a hypogene ore with a grade of 0.79% copper, with 70% copper as chalcopyrite and a crush size of about 80% passing 19 mm.

The results presented in FIG. 10 show that the initial drainage solution or first PLS, leaving the ore bed of the crib (G10/2) contained exceptionally high concentrations of acid (80 g/L) (A), copper (55 g/L) (B) and iron (35 g/L) (C). This PLS solution can be efficiently used in the agglomeration of a new batch of ore, instead of raffinate, with the benefit of utilising the high acid, copper and iron concentrations to promote mineral leaching, allowing reduced fresh acid addition for that batch of ore. The volume of PLS used is based on the required moisture content for ore agglomeration. A typical value in this example is about 0.07 m³/t; which corresponds to the first 10 days of PLS drained from the ore bed, at an irrigation rate of 3 L/h·m². The iron in solution is oxidised to ferric during the ore agglomeration and subsequent curing process under aerated conditions, which contributes to copper mineral leaching. The high copper concentrations promote ferrous ion oxidation, increasing solution oxidation potentials, and increase copper mineral leaching rates during the curing period. It is also expected that excess ferric iron in solution will precipitate during this process as jarosites, or as metasideronatrite, as shown by reactions 3, 4 and 5, respectively. This would lower concentrations of iron in solution and maintain iron levels at the expected equilibrium concentration in the raffinate typically, but not limited to, about 5 g/L in solutions with 150 g/L chloride.

The Determination of Gangue Acid Consumption (GAC) and Control of Acid Addition to Heap Leaching The acid required for chloride leaching is added as fresh concentrated acid during ore agglomeration or as make-up acid to the raffinate solution. In an operation with an ore agglomeration step, acid is thus provided by the addition of concentrated acid to the ore and, or only as, acid in the raffinate solution. The raffinate addition is controlled to achieve the final moisture content specified for the agglomerated ore.

In the case of ore leaching without ore agglomeration acid is provided in the raffinate stream used to irrigate the heap.

The acid required is calculated from the acid consumed by gangue minerals and the acid required to leach the copper minerals. The rate of acid consumption during mineral leaching is dependent on the acid concentration in solution and the temperature.

Test methods have been developed to determine the acid consumed by gangue mineral leaching, so that for a specific ore type the gangue acid consumption (GAC) can be determined, as a function of solution pH, or acid concentration, and temperature. The results of these GAC tests have been used to determine model parameters which are used to calculate the acid demand for the leaching of fast, medium and slow-leaching, gangue minerals. Thus, for a specific ore type the GAC can be determined and the acid addition to ore agglomeration and to the raffinate controlled, in order to meet the acid demand without creating excess acid concentration in solution. The amount of acid required for copper dissolution can be calculated from the copper grade, expected copper dissolution determined by testing, and by considering the ore mineralogy and reaction stoichiometry defined by the leaching reactions, for example as shown by reaction 1. This data is then used to determine the acid addition required during ore agglomeration and the acid concentration required in the raffinate to sustain mineral leaching, and to maximise copper dissolution and to maintain an optimum concentration of acid in the PLS, in order to allow efficient copper extraction by SX.

Determination of Optimal Acid Addition During Agglomeration

Copper-bearing ores contain a wide range of minerals. Sulfide minerals, such as pyrite and chalcopyrite, are not leached under the low Eh conditions of the GAC test. Gangue minerals leached by sulfuric acid typically include metal oxides and carbonates and various potassium-ferrous-magnesium-aluminium silicates. The acid reaction with a gangue mineral is assumed to result in stoichiometric dissolution of the mineral, for example:

Calcite: $CaCO_3 + 2H^+ \rightarrow Ca^{2+} + CO_2 + H_2O$

Chlorite: $Mg_3Fe_2Al_2Si_3O_{10}(OH)_8 + 16H^+ \rightarrow 3Mg^{2+} + 2Fe^{2+} + 2Al^{3+} + 3SiO_2 + 12H_2O$ K-Feldspar: $KAlSi_3O_8 + 4H^+ \rightarrow K^+ + Al^{3+} + 3SiO_2 + 2H_2O$ Kaolinite: $Al_2Si_2O_5(OH)_4 + 6H^+ \rightarrow 2Al^{3+} + 2SiO_2 + 5H_2O$ The chemical reaction between acid and gangue mineral in the ore releases ions into solution. When the solution is relatively dilute and sulfate mineral precipitation can be neglected then the amount of acid consumed by reaction with gangue can be calculated from the sum of the total charge released as ions, expressed mathematically as:

$$\Delta[H^+] = \Delta[K^+] + 2\Delta[Fe^{2+}] + 2\Delta[Mg^{2+}] + 3\Delta[Al^{3+}] + \ldots - \Delta[Cl^-] \quad (1)$$

where $\Delta[H^+]$ is the amount of $H^+$ (protons) consumed (mol/L) and $\Delta[K^+]$, $\Delta[Fe^{2+}]$, $\Delta[Al^{3+}]$ etc are the changes in ion concentrations (mol/L) during the reaction. The summation is over all cations released during the reaction. The change in chloride concentration, $\Delta[Cl^-]$, is included in the calculation to correct for dissolution of NaCl in the ore, which releases $Na^+$ cations (and $Cl^-$ anions) into solution but does not consume acid, and possible leakage of KCl from the pH probe, which releases $K^+$ cations (and $Cl^-$ anions) into solution and does not consume acid.

The acid consumption is 49 $\Delta[H^+]$ in $g$-$H_2SO_4$/L, or 49 $\Delta[H^+]$ V/M in $kg$-$H_2SO_4$/t-ore, where V is the volume of solution in the reactor and M is the weight of the ore (kg). When the solution composition is known at various times during the course of the gangue-acid reaction then the acid consumption can be calculated as a function of reaction time.

The concentration of acid in solution during the reaction can be calculated from an overall charge balance, expressed mathematically as:

$$[H^+] = 2[SO_4^{2-}] + [Cl^-] - [K^+] - 2[Fe^{2+}] - 2[Mg^{2+}] - 3[Al^{3+}] - \ldots \quad (2)$$

where $[H^+]$ is the proton concentration or total concentration of H (as $H^+$ and $HSO_4^-$) in solution (mol/L). The sulfate concentration $[SO_4^{2-}]$ is known from the sulfur concentration [S] in solution.

The concentration of acid in solution is y 49 $[H^+]$ in $g$-$H_2SO_4$/L. The acid concentration can be calculated as a function of time during the reaction.

The pH of the solution in the reactor is maintained constant during the gangue-acid reaction by the addition of concentrated acid to the reactor. The acid added to maintain pH is recorded as a function of time and expressed as $kg$-$H_2SO_4$/t-ore.

The acid added to maintain a constant pH is not equal to the acid consumed by the reaction with the gangue. In fact, the acid added to maintain a constant pH is generally greater than the acid consumed by the reaction with the gangue, increasingly so at low pH, which can be explained as follows. The acid $H_2SO_4$ dissociates in solution to produce the acidic chemical species $H^+$ and $HSO_4^-$, but only $H^+$ (through its activity) influences the solution pH. Because $HSO_4^-$ has no effect on pH, the amount of acid that must be added to maintain pH is greater than the amount of acid that is consumed. The geochemical model EQ3/6 predicts that the proportion of $HSO_4^-$ in solutions of $H_2SO_4$ at pH1 and pH2 is around 40% and 20%, respectively. The release of cations into the solution during the gangue-acid reaction is predicted to increase the percentage $HSO_4^-$. These results suggest that at pH1 the quantity of acid added to maintain a constant pH can be twice the quantity of the acid consumed by the reaction thereof with the gangue.

As noted, the acid added to maintain a constant pH is measured directly during the course of the gangue-acid reaction. The acid added can also be calculated from the solution composition data and doing so provides a check on the consistency of that data. The acid added during a given reaction period is calculated as the sum of the acid consumed in that period, calculated from equation (1), and the difference between the concentrations of acid in solution at the end and beginning of the period, calculated from equation (2), which can be expressed as:

$$\Delta[H^+]_{pH} = 2\Delta[SO_4^{2-}] \quad (3)$$

The acid added to maintain constant pH is 49 $\Delta[H^+]_{pH}$ V/M in $kg$-$H_2SO_4$/t-ore.

From equation (3), the amount of acid added to the reactor can be calculated from the change in sulfate concentration in solution. This simple relationship is a consequence of the fact that the reaction between acid and gangue does not change the sulfate concentration in solution.

For modelling purposes, the specific reaction rate for acid consumption by gangue minerals is given by:

$$R_{Ga} = g_{Ga1} \frac{d\alpha_{Ga1}}{dt} + g_{Ga2} \frac{d\alpha_{Ga2}}{dt} + g_{Ga3} \frac{d\alpha_{Ga3}}{dt} \quad (4)$$

where $R_{Ga}$ is the specific reaction rate (kg-acid/t-ore.s) expressed as the sum of three terms, representing fast, medium and slow reaction, with gangue conversions $\alpha_{Ga1}$, $\alpha_{Ga2}$ and $\alpha_{Ga3}$ and ultimate acid consumptions $g_{Ga1}$, $g_{Ga2}$ and $g_{Ga3}$ (kg-acid/t-ore), respectively. For each of the three types of acid consumption, the gangue conversion varies from zero to one and the acid consumption varies from zero to g as the reaction proceeds. The three types of acid consumption can be regarded as being representative of various gangue species: for example, fast (calcite), medium (chlorite and biotite), and slow (kaolinite, K-feldspar and sericite).

The acid consumption by gangue is obtained by integrating the reaction rate given by equation (4) over the elapsed time of the reaction:

$$GAC = g_{Ga1}\alpha_{Ga1} + g_{Ga2}\alpha_{Ga2} + g_{Ga3}\alpha_{Ga3} \quad (5)$$

where GAC is the acid consumption in kg-acid/t-ore.

For each of the three types of acid consumption, the rate of gangue conversion during reaction is expressed in Arrhenius form as:

$$\frac{d\alpha_{Ga}}{dt} = \frac{k_{Ga}}{(d_p/d_0)^{n_p}} [H^+]^{n_H} \exp\left(-\frac{E_{Ga}}{R}\left(\frac{1}{T} - \frac{1}{298}\right)\right)(1 - \alpha_{Ga})^{n_\alpha} \quad (6)$$

where $k_{Ga}$ is the rate constant $((L/mol)^{n_H}/s)$, $E_{Ga}$ is the activation energy (cal/mol), $d_p$ is the ore particle size (mm), $d_0$ is a characteristic ore particle size (taken as 10 mm), $[H^+]$ is the proton concentration (mol/L), T is the temperature (K), R is the universal gas constant (1.986 cal/mol·K), and $n_p$, $n_H$ and $n_\alpha$ are exponents for particle size, acid concentration and gangue conversion, respectively. As shown in equation (5), the rate of acid consumption by gangue is expressed in terms of the proton concentration rather than the proton activity or pH.

The concentration of a cation released into solution during the gangue-acid reaction is expressed as:

$$[C] = (g_{Ga1}\alpha_{Ga1}Y_{C1} + g_{Ga2}\alpha_{Ga2}Y_{C2} + g_{Ga3}\alpha_{Ga3}Y_{C3})/98\,(M/V) \quad (7)$$

where [C] is the cation concentration (mol/L) and $Y_{C1}$, $Y_{C2}$ and $Y_{C3}$ are the cation release factors for each of the three classes of acid consumer, expressed as the number of moles of the cation released per mole of acid consumed (mol-C/mol-acid). For example, if calcite is the only fast reacting gangue species then the release factor for cation $Ca^{2+}$ is $Y_{Ca1} = 1$. Similarly, if chlorite is the only medium reacting gangue species then the release factors for cations $Mg^{2+}$, $Fe^{2+}$ and $Al^{3+}$ are $Y_{Mg2} = 0.375$, $Y_{Fe2} = 0.25$ and $Y_{Al2} = 0.25$, respectively.

The ultimate weight of an element liberated by reaction between acid and gangue minerals is constrained to be less than the weight of the element in the ore:

$$(g_{Ga1}Y_{C1} + g_{Ga2}Y_{C2} + g_{Ga3}Y_{C3})W_C/98 < G_C \quad (8)$$

where $W_C$ is the atomic weight of the element and $G_C$ is the grade (kg-C/t-ore) of the element in the ore.

The cation release factors are constrained by charge balance considerations:

$$Y_K + 2Y_{Fe(II)} + 2Y_{Mg} + 3Y_{Fe(III)} + 3Y_{Al} + \ldots = 2 \quad (9)$$

The model parameters in equations (4) to (7), namely $k_{Ga}$, $E_{Ga}$, $g_{Ga}$, $Y$, $n_p$, $n_H$ and $n_\alpha$, are determined by fitting the model calculated acid consumption and solution composition to the measured data from the GAC tests.

Figure 11:
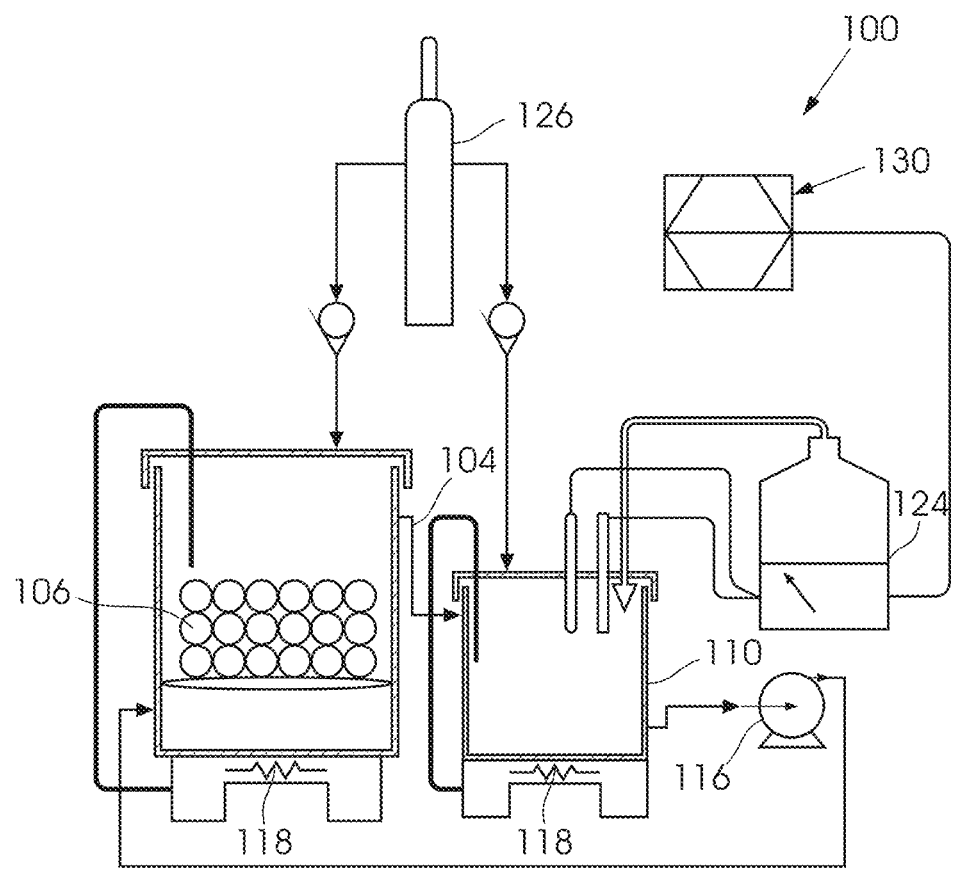
FIG. 11 illustrates a test reactor for determining gangue acid consumption at a constant pH.

The experimental GAC determination is carried out using an arrangement 100 as is shown in FIG. 11. The arrangement includes a 5.5 L reaction vessel 102 equipped with an overflow outlet 104 at 4.5 L, in which vessel is placed 2750 g of an ore sample 106 (the size of the sample is increased with larger size fractions). The reaction vessel 102 is connected via tubing to a 3 L side reactor 110. A major portion of the lixiviant (5300 mL) is introduced into this connected system and circulated via a pump 116 from the side reactor 110 to the reaction vessel 102 at a fixed rate, flowing back via gravity into the side reactor 110.

Once the 5300 mL of lixiviant is in the system, the lixiviant is brought to temperature, by means of heaters 118 underneath the reactors 102, 110. The pH (120) and final volume (122) are adjusted to the required starting values by the addition of 200 mL of an iron-containing acid solution 124 to give a final volume of 5500 mL.

A reducing atmosphere is maintained over the reaction surfaces by excluding air from the reactors 102 and 110 and by introducing a flow of nitrogen 126 into the reactors 102, 110. The reactors are sealed allowing for the positive displacement of nitrogen from the reactors 102, 110. Solution samples are taken at stipulated time intervals from the side reactor 110 and analysed for a selection of elements using a computer 130. The pH and solution redox potential values are recorded over time in the computer 130.

Figure 12:
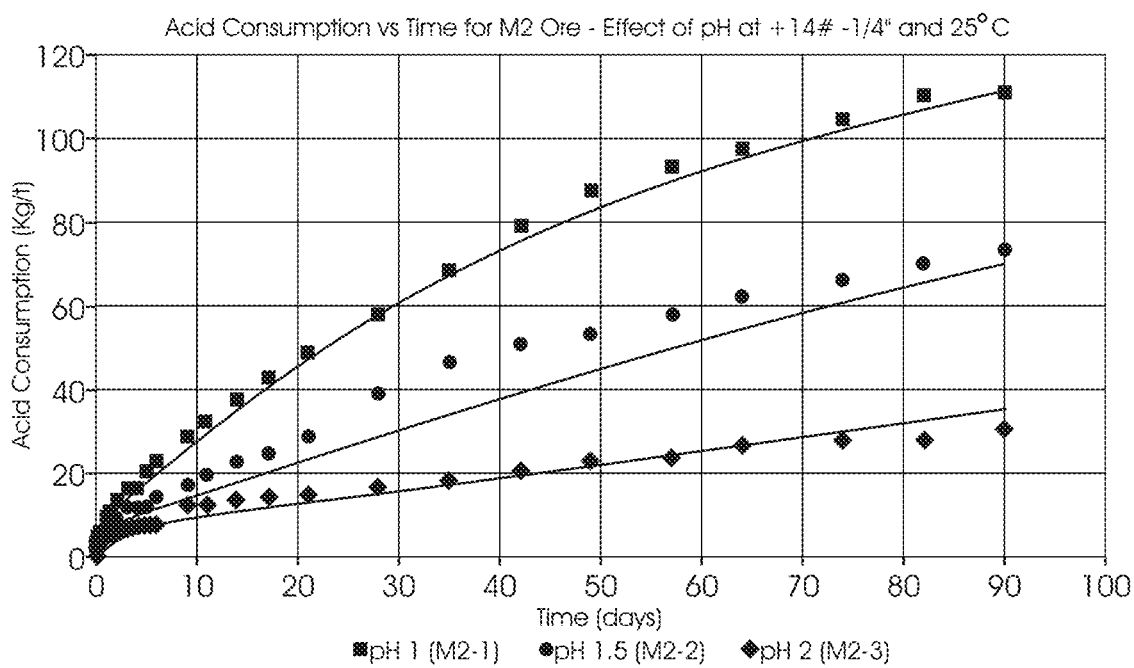
FIG. 12 graphically depicts gangue acid consumption for a hypogene ore type, as a function of pH, against time.

FIG. 12 graphically depicts the results obtained from the test arrangement 100 shown in FIG. 11. Acid consumption over time is illustrated for pH values pH1 (C), pH1.5 (B) and pH2 (A). It is evident that acid consumption is strongly affected by the solution pH i.e. the acid concentration in solution.

It is also possible to use the reactor 100 to determine the effect of temperature and the effect of different crush sizes of the ore samples on acid consumption rates Typical results obtained using the method GAC test reactor are shown in FIG. 12. The results show how acid consumption is strongly affected by the solution pH or acid concentration in solution. As indicated the effect of temperature and the testing of ore samples at different crush sizes may be done to determine acid consumption rates as a function of particle size and temperature.

The following description, with reference to FIGS. 13 to 23, relates to tests done in respect of aspects of the invention, as described hereinbefore.

Example 1: Description of an Integrated Pilot Plant Technical Evaluation of the Method of the Invention An integrated pilot plant incorporating 9 cribs and a solvent extraction plant has been established to replicate the commercial application of the process of the invention at pilot scale. This process is designed to treat various low grade chalcopyrite ores using a dynamic "race track" style heap leach operation. A "race track" style heap comprises of multiple sectors. New sectors get stacked and oldest most leached sectors are removed from the pad. The pad is re-used.

Each crib contains approximately 40T of ore, has a cross sectional area of 4 m², an operating height of 7.5 m and an overall height of 10 m. The cribs are operated to simulate a commercial operation with 9 sectors. Like the commercial heap, the process is dynamic with periodic removal of leach residue from a completed crib and replacement of residue with fresh ore in a vacant crib.

Three separate phases of operation were undertaken. The range in composition of the principal copper sulfide minerals and gangue minerals contained in the ore samples tested, and a brief description of the operation are summarised in Table 1.

TABLE 1

Brief Description of Pilot Plant Technical Evaluation Operational Phases

| Item | Phase I | Phase II | Phase III |
|---|---|---|---|
| Ore Crush size 80% passing (mm) | 19.05 | 19.05 | 19.05 |
| Copper Grade (%) | 0.49-0.75 | 0.38-0.79 | 0.3-0.6 |
| CSR* chalcocite (%) | >10 | 10-20 | 10-20 |
| CSR* covellite (%) | 10-20 | <10 | <10 |
| CSR* chalcopyrite (%) | 40-75 | 65-75 | 40-75 |
| Pyrite (%) | 2-6 | 2-4 | 3-7 |
| Chlorite (% | 0.1-1 | 0-1 | 0-9 |
| Biotite (%) | 0-0.3 | 0-0.03 | 0-2 |
| Kaolinite (%) | 8-16 | 10-45 | 10-30 |
| Description of Phase Operation | Start up and initial data collection | Test variation of leach conditions and ore type. | Operate in closed circuit |

*CSR-Copper Source Ratio (Percentage of the total copper that is contained in this mineral)

The ore samples are crushed in a 3 stage crushing circuit. The crushed ore is agglomerated before being loaded into the cribs. Sodium chloride (salt), acid and raffinate (or other copper, iron & acid containing process liquor) are added to the ore in the agglomeration process. The agglomerated ore is then placed inside an empty crib; cured for a period, following which irrigation commences. At the end of the irrigation cycle, each crib is drained, irrigated with water to wash, drained again and finally emptied out. The empty crib is then prepared to accept fresh agglomerated ore.

Phase I and phase II involved start-up of the operation and gathering initial data and as well as construction of additional cribs for the phase III closed circuit operation.

In the phase III operation low grade ores were included with copper grades as low as 0.3% Cu and with up to 75% of the contained copper associated with chalcopyrite (CSR chalcopyrite of 75%). The operation consisted of a 45 day curing period, 20 day wetting period, 360 days irrigation, 20 days washing and 30 days draining (total 475 days), before unloading and sample processing.

The phase III operating schedule was designed to allow for the loading and unloading of a crib every 45 days, thereby simulating a commercial dynamic pad operation and industrial liquid handling. This closure was imperative in order to obtain steady state impurities concentrations and identification of possible operational problems. The operation was maintained in a closed circuit, reintroducing the wash water to generate the new raffinate that was lost due to residue moisture and evaporation. The water addition rate was maintained at 0.11 m³/T ore. The fresh make-up water was used for washing loaded organic to remove chloride and for washing residue ore according to the method of invention described hereinbefore.

Figure 13:
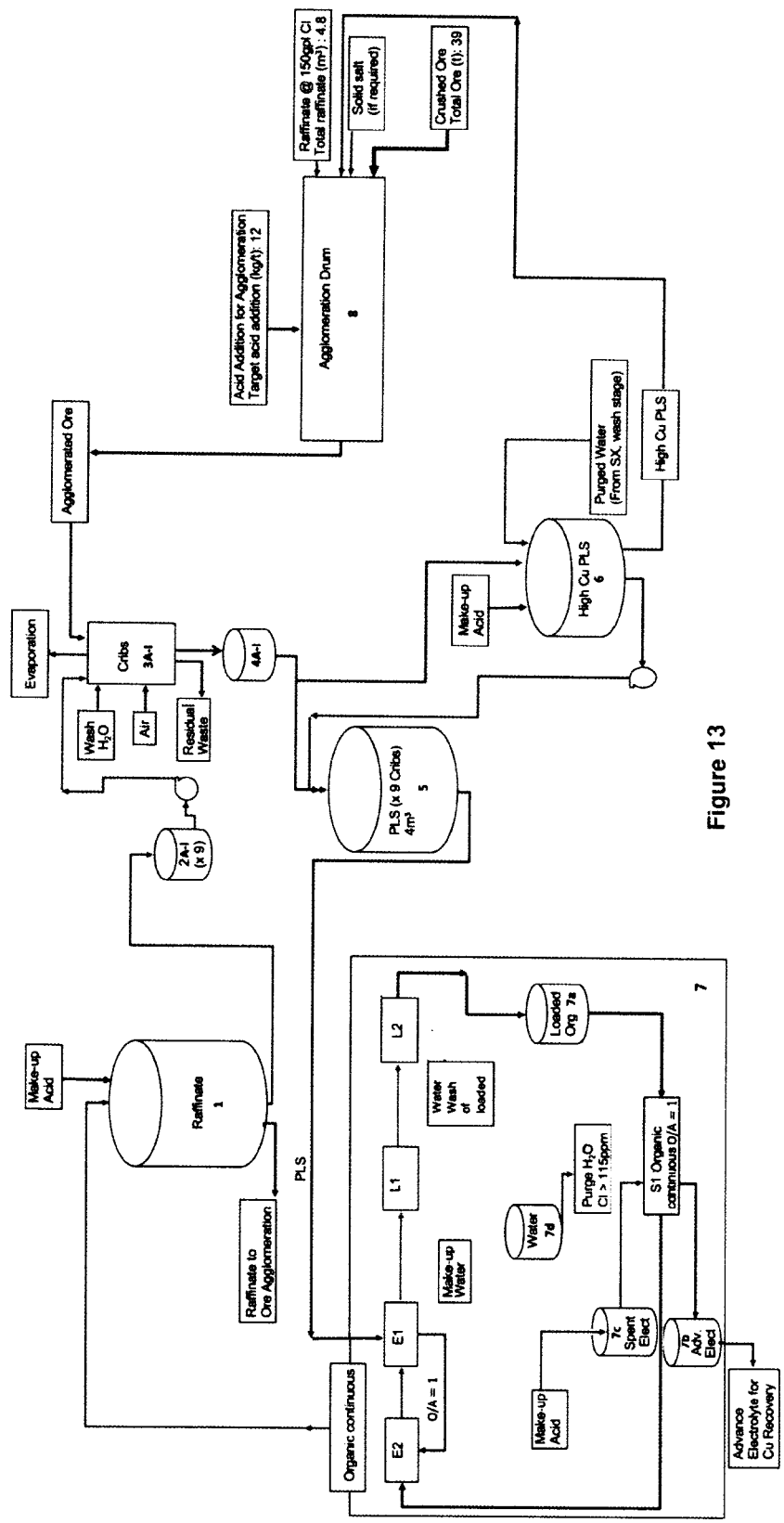
FIGS. 13 to 27 relate to circuits used in test work and data arising from such test work.

The pilot plant is operated as a closed system with outputs and inputs carefully controlled to mimic a commercial heap leach operation. That is, the inputs and outputs are controlled so that fresh water added is limited to exactly balance water lost by evaporation, loss as moisture in leached residue (or rippos) and replacement of water lost in process solution purge (if required to lower impurities). The process flowsheet of the pilot plant is shown in FIG. 13. The main components and operation of the pilot plant are summarised as follows:

Raffinate Tank 1: Storage of return raffinate from solvent extraction (SX) 7. Provides feed to separate 1 m³ raffinate feed tanks 2A-I to each crib, 3A-I. Make-up acid may be added to the raffinate tank as required to meet the operational acid demand of the process.

Pregnant Leach Solution (PLS) 4 & 5: The PLS solution from each crib (3A-I) is collected in 1 m³ PLS tanks 4A-I. The PLS is transferred from tanks 4A-I to PLS holding tank 5.

High Cu PLS 6: The first PLS collected from initial irrigation of the cribs following ore curing has a high copper content. This initial PLS is collected in holding tank 6. Make-up acid may be added to the high copper PLS in tank 6. Purge water from SX may be added to the high copper PLS in tank 6.

Ore agglomeration 8: Ore is agglomerated in an agglomeration drum. Raffinate from Tank 1 is added to ore. Acid and solid salt are added to meet target acid addition and total salt addition as required. The high copper PLS 6, may be used in ore agglomeration to allow direct return of copper and acid (contained in the high Cu PLS) to ore agglomeration. A high copper content in agglomerated ore with acid may improve copper dissolution during ore curing in the initial rest step. Agglomerated ore is transferred to load cribs (3A-I) when required.

Ore is leached in cribs 3A-I: The agglomerated ore is stacked in the cribs. It is allowed to cure (initial rest period). Irrigation is then commenced. Irrigation starts slowly to ensure wetting of the ore. Irrigation is carried out by pumping the low copper raffinate from the solvent extraction process to the top of the cribs. The liquor is distributed over the crib surface by application through a dripper network. The solution permeates down through the ore within each crib. Simultaneously air is introduced into the base of each crib. Copper is solubilised by the combination of the acid in the process liquor and oxygen in the air. The irrigation liquor reports to the base of the crib. It now has an elevated copper content and is called PLS (pregnant leach solution). This is collected and reports to the solvent extraction process.

Following ore leaching the irrigation of the ore with raffinate is stopped. The ore bed is allowed to drain and then the ore is washed with wash water to recover entrained chloride (salt) and dissolved copper. Washed leached ore residue is then removed from the crib to waste.

Solvent Extraction (SX) 7: The copper is recovered from the PLS by solvent extraction. The copper is loaded onto the organic in two extraction stages, E1 and E2. The loaded organic is then washed with water in a two stage wash L1 and L2. The wash is required to remove entrained aqueous solution, so that the chloride content of advanced electrolyte after stripping of loaded organic is <50 ppm. Following the wash stage, loaded organic is then stripped in S1 to recover copper to the advance electrolyte 7b. Spent electrolyte for loaded organic stripping is provided from holding tank 7c. If required, make-up acid may be added to the spent electrolyte in holding tank 7c to increase the acid concentration to the amount required for complete stripping of the loaded organic. Advance electrolyte is removed from the circuit for copper recovery and spent electrolyte is returned to the circuit. The wash efficiency of loaded organic may be improved by increasing the number of wash stages to three, as referred to in the preceding description. Increased wash efficiency reduces the wash water volume required for washing loaded organic, allowing increased water for washing of leached ore residue resulting in increased recovery of chloride and copper, by displacement of entrained solution in the ore residue.

The operating parameters for phase I, phase II and phase III are summarised in Table 2.

TABLE 2

Pilot Plant Operating Parameters for Phase I, Phase II and Phase III Operations

| Parameter | Units | Phase I | Phase II & III |
|---|---|---|---|
| Crib irrigation area (per crib) | m² | 4 | 4 |
| Ore bed height | m | 5.4 | 7.5 |
| Ore loaded (per crib) | T | 36 | 44 |
| Acid in ore agglomeration | kg/T | 12 | 12 |
| Target moisture in ore agglomeration | mass % | 8.5 | 8.6 |
| Bulk density ore | T/m³ | 1.65 | 1.60 |
| Initial rest or curing period | days | 45 | 45 |
| Ore bed temperature | ° C. | 15-30 | 15-30 |
| Aeration rate | Nm³/h/m² | 0.13 | 0.13 & 0.325 |
| Raffinate application rate on period | — | 9 h on at 6 L/h/m² | 12 h on at 6 L/h/m² |
| Leach cycle operation | days | Irrigation 200-500 | 20 days low irrigation (ore wetting) 360 6ays irrigation, 20 days wash cycle. |
| Flowsheet operation | — | Closed with SX | Closed with SX and wash stage |
| Closed circuit raffinate solution | — | 5 g/L Cu, 15 g/L Fe, 8 g/L H₂SO₄, 150 g/L Cl | 0.5 g/L Cu, 1-3 g/L Fe, 8 g/L H₂SO₄, 150 g/L Cl |

Figure 14:
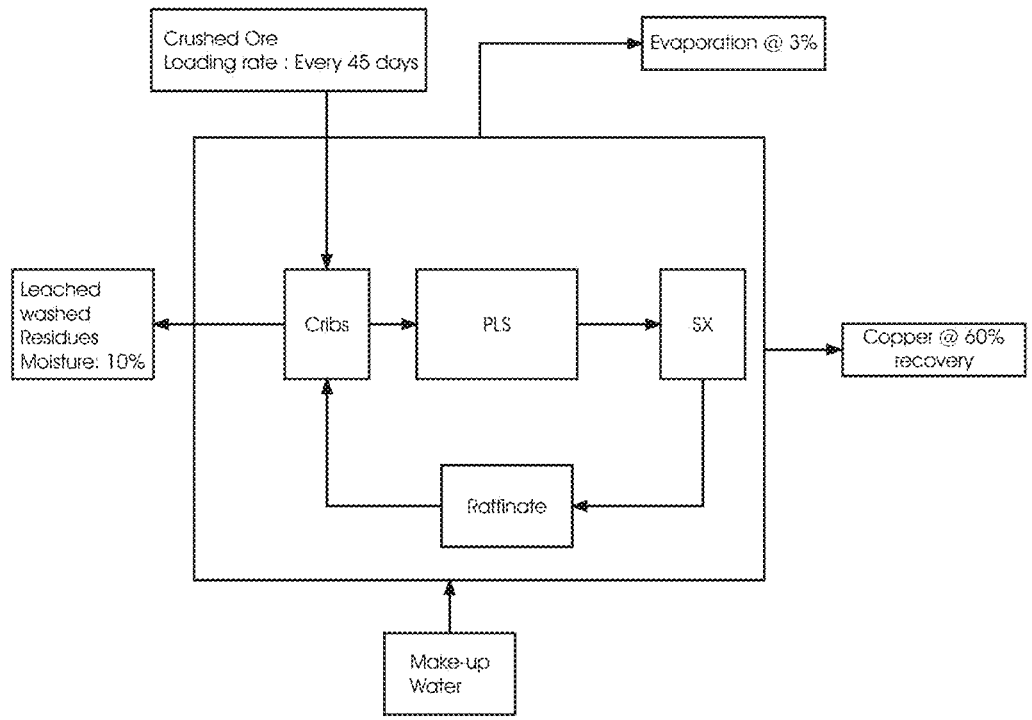

The simplified mass balance diagram for the pilot heap showing the inputs and outputs is shown in FIG. 14. Typical values for the ore, acid and water balance are shown in Table 3.

TABLE 3

Pilot Plant Mass Balance Summary Showing
Inputs and Outputs for Phase II Operation
Phase II Pilot Plant Mass Balance

|  | In | Out | In (kg/T) | Out (kg/T) |
|---|---|---|---|---|
| Ore and Copper | | | | |
| Total Ore loaded dry (T)-9 cribs | 348.6 | — | | |
| Total copper loaded (0.5% CuT) (T) | 1.7 | | 5.00 | |
| Total copper recovered @ 60% recovery average (T) | | 1.0 | | 3.00 |
| Total copper lost in residues (T) | | 0.7 | | 2.00 |
| Total residues un-loaded (T) | | 348.6 | | — |
| Acid Balance | | | | |
| Agglomeration acid added @ 12 kg/t (kg) | 4183.2 | | 12.0 | |
| Acid loss in residue moisture @ 10.5% moisture (kg) | | 18.0 | | 0.05 |
| Gross Acid consumption (by gangue and metals dissolution) (kg) | | 6274.8 | | 18.00 |
| Acid generated by EW (kg) | 1708.1 | | | |
| Make-up acid added (kg) | 401.4 | | 1.15 | |
| Water Balance | | | | |
| SX organic wash water (m3) | 4.3 | | | |
| Wash water @ 0.1 m3/t (m3) | 34.9 | | | |
| Moisture in residues @ 10.5% average-(m3) | | 36.6 | | |
| Water loss due to evaporation @ 5.4 L/day (m3) | | 2.8 | | |
| Purged water (m3) | | Zero | | |

Figure 15:
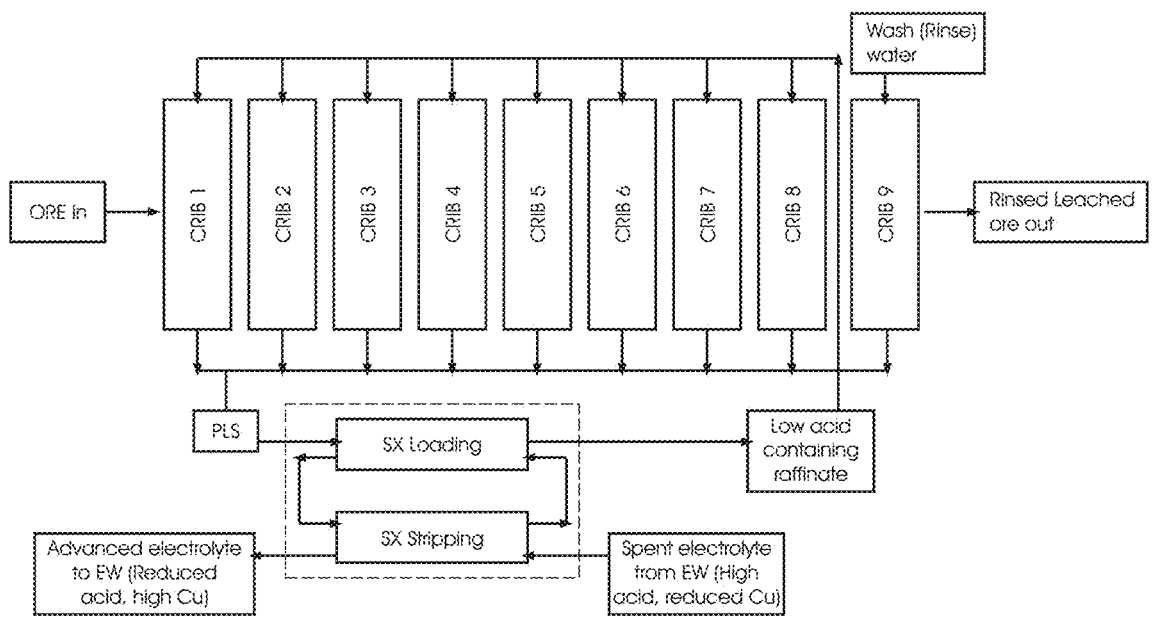

The configuration of the leach area pilot plant flowsheet is shown in FIG. 15. This is an acceptable flowsheet because the ore used in the pilot plant operation was predominantly chalcopyrite and has a low copper head grade. The kay aspect of the flowsheet is that a low acid raffinate is generated through solvent extraction. This low acid raffinate is distributed over all sectors (cribs in this case). The low acid tenor minimises rates of gangue leaching.

If the ore had higher grades and especially if the contained copper were predominantly secondary copper minerals such as covellite, chalcocite or bornite then, a flowsheet that favours increased gangue acid consumption in leach may have been employed as described hereinbefore. Such a flowsheet is shown in FIG. 16.

Figure 16:
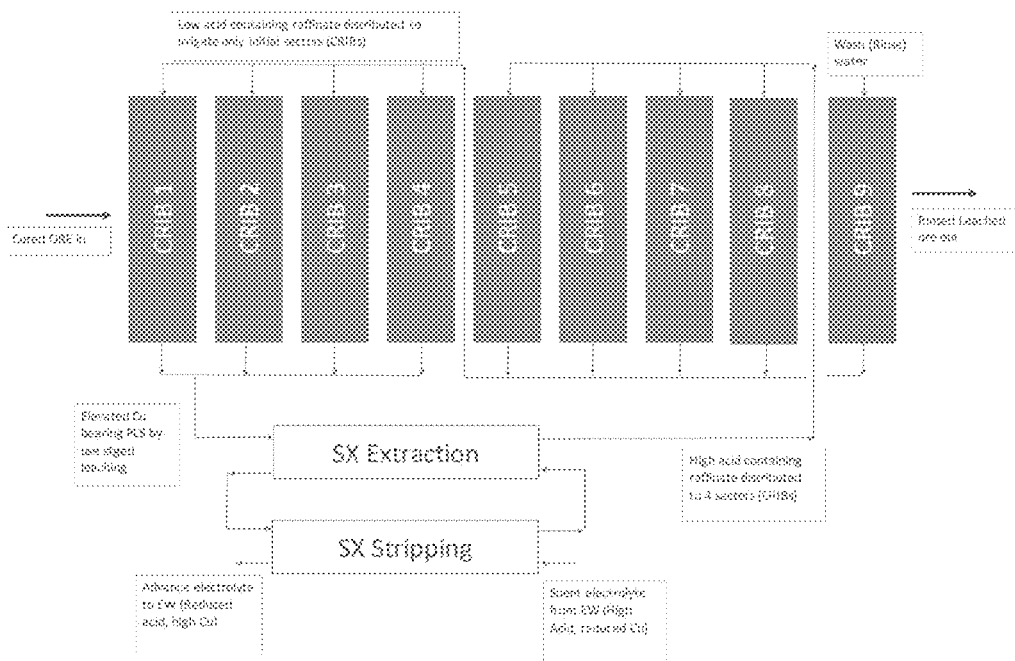

The option in FIG. 16 could be operated as shown, or with the solvent extraction operating on the liquor from the second 4 cribs as opposed to the $1^{st}$ four cribs as shown. The number of stages can be expanded from two to three, or as many as may be deemed necessary.

Example 2: The Acid Balance

The preceding description specifies the need to balance the acid across the process. Acid is required as a reagent in agglomeration to effect copper dissolution during the cure phase. Acid is also required as a reagent during the leach phase for copper dissolution. Acid is generated by electrowinning the dissolved copper into copper metal. This acid is passed back into the process via solvent extraction and it all reports into the process during the leach phase.

In the leach phase of the process, the amount of acid generated by EW needs to be offset by the amount of acid that is still consumed by reaction with gangue and copper sulphide minerals, as well as that left in the moisture after the leached ore is washed.

In an ideal operation the amount of acid required by the leach and that generated by EW match and the leach phase of the operation is acid neutral. In this case the acid consumption and supply are balanced so that an acid balance is achieved. It is also acceptable if some acid is required to be added in the leach phase. What needs to be avoided is the situation where, in the leach phase, there is more acid returned by EW than is consumed by gangue and copper sulphide mineral leaching. This is because this is a closed circuit operation with a final wash stage and so the excess acid will accumulate. The elevated concentration of acid in the process liquors would become detrimental to the solvent extraction process, as this relies on having a low acid tenor in the feed to assist with copper loading onto the organic (proton/copper equilibrium).

In Example 1, Table 3 shows the balance around the cribs for the phase II operation. Firstly, it can be seen that the amount of acid that leaves the leach process in moisture after washing the leached ore is very small (0.05 kg/$t_{ore}$) and hence this will be discounted from further discussion. Secondly, it can be seen that on average the leach phase was acid negative. A small amount of acid was added to control pH during the leaching (1.15 kg/$t_{ore}$). This is ideal and if this combination of ore were to be fed to a process and treated in this manner, there would no issues from an acid perspective.

Table 4 shows the acid consumption and copper dissolution for each crib.

TABLE 4

Individual CRIB copper and acid data for phase II

| CRIB code | G5/2 | G9/2 | G10/2 | G3/2 | G6/2 | G4/2 | G1/2 | G2/2 | G8/2 |
|---|---|---|---|---|---|---|---|---|---|
| Acid used in cure (kg/t of ore) | 10.19 | 9.07 | 12.84 | 12.62 | 11.84 | 11.53 | 12.25 | 12.26 | 11.89 |
| Total acid (kg/t of ore) | 20.73 | 16.41 | 19.47 | 20.26 | 16.38 | 16.43 | 21.63 | 16.09 | 18.66 |
| Copper leached in cure | 11% | 6% | 7% | 15% | 8% | 16% | 18% | 3% | 9% |
| Copper leached total | 60% | 55% | 55% | 75% | 61% | 65% | 69% | 56% | 61% |
| Copper Head grade | 0.62% | 0.66% | 0.79% | 0.45% | 0.37% | 0.37% | 0.59% | 0.36% | 0.43% |
| Mass acid used in cure (kg/t of ore) | 10.19 | 9.07 | 12.84 | 12.62 | 11.84 | 11.53 | 12.25 | 12.26 | 11.89 |
| Mass acid used in leach (kg/t of ore) | 10.55 | 7.34 | 6.63 | 7.64 | 4.54 | 4.90 | 9.37 | 3.83 | 6.77 |
| Mass Cu leached in cure (kg/t of ore) | 0.71 | 0.40 | 0.58 | 0.66 | 0.31 | 0.58 | 1.06 | 0.09 | 0.39 |
| Mass Cu leached in leach cycle (kg/t of ore) | 2.99 | 3.26 | 3.74 | 2.72 | 1.96 | 1.82 | 3.02 | 1.94 | 2.22 |
| Acid produced through EW during leach cycle (kg/t of ore) | 5.71 | 5.64 | 6.66 | 5.22 | 3.50 | 3.71 | 6.29 | 3.14 | 4.02 |
| Is the leach phase acid positive? | No | No | Yes | No | No | No | No | No | No |
| Percentage of Cu leached in Cure to total leached | 19% | 11% | 13% | 20% | 13% | 24% | 26% | 4% | 15% |

The data in Table 4 shows the copper leached as well as acid used in both the cure phase and the leach phase for each crib. It also shows the amount of acid that would be generated and transferred back to the process by EW.

The data shows that in general nearly all cribs were acid negative during leach, the exception being crib G10/2. If a commercial operation were to treat this particular ore, in this manner for an extended time, there would be a build of acid in the circuit. The operation would either need to reduce the acid supplied into the agglomeration phase to bring the circuit to an acid-neutral state, or employ a flowsheet such as that shown in FIG. 16 as opposed to the flowsheet used (FIG. 15) as this would assist to increase gangue acid consumption and bring the process back to acid neutral or acid deficit. The latter would be preferable as it would maintain the copper leach performance of the cure step.

There are two key differences between the G10/2 ore and the other ores. The first is the head grade. This ore has a higher than average copper content and that, combined with a reasonable dissolution, means that EW produces higher than average acid. Secondly, the amount of acid consumed in the leach phase by gangue and copper minerals was only 6.6 kg/t. This is less than amount of acid that is likely to have been required to leach the 3.7 kg/t of copper generated in this period. This suggests that the gangue minerals had a low reactivity with acid and possibly there was a precipitation of acid generating compounds such as jarosite.

This example shows that control may be required to ensure the process does not become acid generating and that an understanding of gangue mineral leach behaviour is key to predicting acid needs. This understanding then needs to be coupled with the appropriate flowsheet configuration for the leach period for optimal value. "Optimal value" is typically the maximum amount copper that can be leached because the value of the copper is significantly higher than the cost of the acid.

Example 3: The Acid Balance—Interaction Between Cure Phase and Final Extent of Copper Dissolution If extra acid were to be added to the agglomeration stage of phase II and that acid effected a proportional increase in chalcopyrite leaching, it could be estimated at what point the acid balances for the phase II cribs would become acid positive.

Table 5 shows that if the acid consumed in the cure phase were to be increased by 30%, the net result would be that 8 of the 9 cribs would become acid positive in the leach phase. This would require a change in flowsheet to a multistage approach. It is possible that, in addition to the change in flowsheet configuration some reduction of the amount of acid added in the cure phase would be necessary to prevent that occurrence and to limit the copper dissolution.

These ores have a reasonably high proportion of chalcopyrite. It is known that chalcopyrite leaches at a slower rate than the other copper sulphide minerals, such as chalcocite and covellite. It is reasonable to assume that it is predominantly chalcopyrite that is leached at the end of the leach phase. Leaching chalcopyrite requires 4 protons ($H^+$) for every $Cu^{2+}$ that is liberated into solution. However, in EW only 2 protons ($H^+$) are generated for every $Cu^{2+}$ that is plated out as copper metal (Cu). This means that if the final extent of copper leaching that occurs in the leach phase increased for these ores, there would be a point where the process returned to being acid negative in leach, despite a higher copper dissolution having been achieved in the cure phase, with a low gangue acid consuming ore and the leach operating according to the flowsheet shown in FIG. 15.

Table 6 shows some column leach results for these same ores. These columns performed better than the cribs partly because of operating conditions and partly because columns get better solution distribution. The details of the reasons for the performance change is not relevant to this discussion. What is relevant though is that these columns show that despite getting much higher copper dissolution in the cure phase, all would have been acid negative in their leach phase, including the ore used in crib G10/2 (see column MK104), the reason is because of the additional leaching achieved in the leach phase and consequent acid demand as discussed in the previous paragraph.

TABLE 5

Individual crib copper and acid data for phase II assuming a 30% increase in acid consumption in the cure phase relating to copper.

| CRIB code | G5/2 | G9/2 | G10/2 | G3/2 | G6/2 | G4/2 | G1/2 | G2/2 | G8/2 |
|---|---|---|---|---|---|---|---|---|---|
| Adjustment acid consumed in cure phase | 30% | 30% | 30% | 30% | 30% | 30% | 30% | 30% | 30% |
| Acid used in cure (kg/t of ore) | 13.24 | 11.79 | 16.69 | 16.41 | 15.40 | 14.99 | 15.93 | 15.94 | 15.45 |
| Total acid (kg/t of ore) | 20.73 | 16.41 | 19.47 | 20.26 | 16.38 | 16.43 | 21.63 | 16.09 | 18.66 |
| Copper leached in cure | 27% | 19% | 23% | 42% | 39% | 46% | 38% | 36% | 36% |
| Copper leached total | 60% | 55% | 55% | 75% | 61% | 65% | 69% | 56% | 61% |
| Copper Head grade | 0.62% | 0.66% | 0.79% | 0.45% | 0.37% | 0.37% | 0.59% | 0.36% | 0.43% |
| Mass acid used in cure (kg/t of ore) | 13.24 | 11.79 | 16.69 | 16.41 | 15.40 | 14.99 | 15.93 | 15.94 | 15.45 |
| Mass acid used in leach (kg/t of ore) | 7.49 | 4.62 | 2.78 | 3.85 | 0.98 | 1.44 | 5.70 | 0.15 | 3.21 |
| Mass Cu leached in cure (kg/t of ore) | 1.70 | 1.28 | 1.82 | 1.89 | 1.46 | 1.70 | 2.25 | 1.28 | 1.55 |
| Mass Cu leached in leach cycle (kg/t of ore) | 2.00 | 2.38 | 2.49 | 1.49 | 0.81 | 0.70 | 1.83 | 0.75 | 1.06 |
| Acid produced through EW during leach cycle (kg/t of ore) | 5.71 | 5.64 | 6.66 | 5.22 | 3.50 | 3.71 | 6.29 | 3.14 | 4.02 |
| Is the leach phase acid positive? | No | Yes | Yes | Yes | Yes | Yes | Yes | Yes | Yes |
| Percentage of Cu leached in Cure to total leached | 46% | 35% | 42% | 56% | 64% | 71% | 55% | 63% | 59% |

TABLE 6

Individual column leach copper and acid data for column leaching of the same ores used in the phase II crib program

| Column Code | MK117 | MK102 | MK104 | MK115 | MK113 | MK114 | MK104 | MK119 | MK120 |
|---|---|---|---|---|---|---|---|---|---|
| Acid used in cure (kg/t of ore) | 10.3 | 10.6 | 14.5 | 13.1 | 8.4 | 11.6 | 14.5 | 12.5 | 12.5 |
| Total acid (kg/t of ore) | 26.2 | 23.8 | 25.9 | 24.9 | 18.7 | 20.9 | 25.9 | 26.7 | 18.9 |
| Copper leached in cure | 21% | 26% | 27% | 29% | 10% | 12% | 27% | 36% | 27% |
| Copper leached total | 77% | 76% | 68% | 79% | 51% | 46% | 68% | 85% | 74% |
| Copper Head grade | 0.62% | 0.66% | 0.79% | 0.45% | 0.68% | 0.81% | 0.37% | 0.59% | 0.36% |
| Mass acid used in cure (kg/t of ore) | 10.34 | 10.64 | 14.52 | 13.08 | 8.41 | 11.64 | 14.52 | 12.53 | 12.50 |
| Mass acid used in leach (kg/t of ore) | 15.85 | 13.18 | 11.40 | 11.87 | 10.27 | 9.23 | 11.40 | 14.22 | 6.36 |
| Mass Cu leached in cure (kg/t of ore) | 1.29 | 1.74 | 2.11 | 1.31 | 0.69 | 0.94 | 0.99 | 2.11 | 0.98 |
| Mass Cu leached in leach cycle (kg/t of ore) | 3.49 | 3.26 | 3.30 | 2.22 | 2.79 | 2.82 | 1.55 | 2.93 | 1.67 |
| Acid produced through EW during leach cycle (kg/t of ore) | 7.37 | 7.72 | 8.35 | 5.46 | 5.38 | 5.79 | 3.91 | 7.78 | 4.09 |
| Is the leach phase acid posistive? | No | No | No | No | No | No | No | No | No |
| Percentage of Cu leached in Cure to total leached | 27% | 35% | 39% | 37% | 20% | 25% | 39% | 42% | 37% |

Example 4: Extrapolation of Phase II CRIB data

Figure 17:
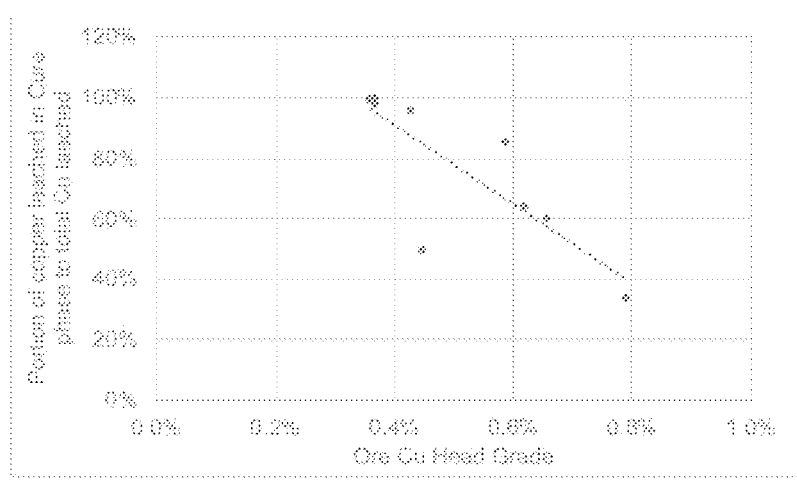

It is possible to extrapolate the phase II crib data to get an indication of what the ideal split would be between cure and leach phase copper dissolution for theses ores at a maximum performance. A maximum target for copper dissolution from these ore type would be ~85%. If that were to occur and the gangue acid requirements remained the same, it would be possible to estimate the maximum percentage of the total copper that could be leached in the cure phase but still allow the process to remain acid neutral in the leach phase. This is depicted in FIG. 17 which shows that there is a strong trend regarding proportion of cure phase copper dissolution to the ore copper head grade. At low head grades all the copper can be leached in the cure phase and the leach phase would still remain acid neutral. This makes sense as the amount of acid generated by the EW is directly proportional to mass of copper leached. Thus, at low head grades only a small amount of acid is generated by EW and this acid is consumed by residual acid soluble gangue minerals in the leach phase. When the grade increases there is insufficient gangue acid demand to offset the acid from EW and hence an increasing amount of chalcopyrite needs to be leached in the leach phase.

Although a trend line has been fitted to the data, the data is scattered because the gangue mineral composition of the ore varies between the samples, and hence so does the point at which the acid balance converges. This is important as it underlines that the knowledge and understanding of the leach behaviour of the gangue minerals are critical to optimising the process.

This plot would look different if the majority of the copper minerals were bornite, chalcocite or covellite. For these minerals the number of protons ($H^+$) required for leaching is 2.4, 2 and 2 respectively. Thus, there is little or no differential between the protons required to leach the copper and the protons that are generated in EW. Hence the process would be more reliant on continued gangue acid demand during the leach phase to prevent it becoming acid positive. Alternatively, cure phase copper leaching would need to be lower.

The trend line of this plot would shift upward if a multistage leach process were to be employed.

Example 5: Estimation of Gangue Acid Consumption

Figure 18:
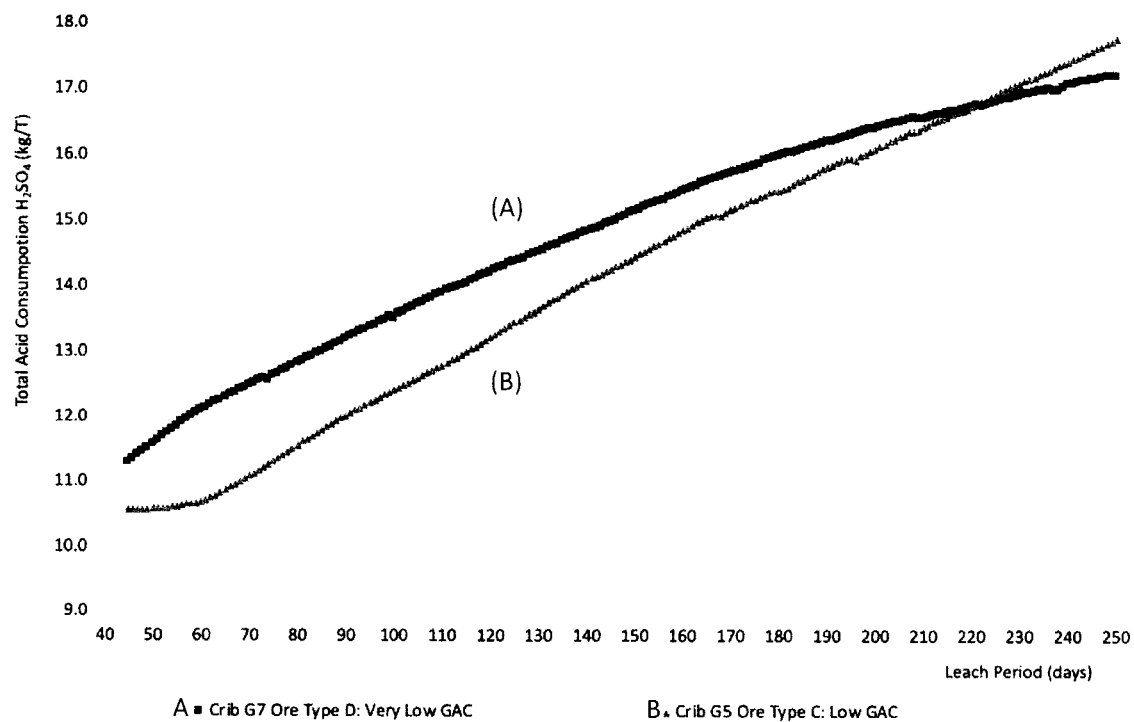

The results in FIG. 18 show the total acid consumption from operation of cribs G5 (B) and G7 (A) in the phase III pilot plant operation, treating two different ore types. The mineralogy of the two ore types loaded in the cribs are noted in Table 7. The results show the higher biotite and chlorite content of the ore type C (crib G5 phase III) compared to ore type D (crib G7 phase III). Biotite and chlorite have been found to be the main contributors to GAC, typically leaching at a faster rate compared to other silicate minerals.

TABLE 7

Mineralogy of Ore Types C and D Highlighting Gangue Mineral Content

| Mineral | Ore Type C Low Acid Consumption | Ore Type D Very Low Acid Consumption |
|---|---|---|
| Chalcocite | 0.13 | 0.08 |
| Covellite | 0.08 | 0.06 |
| Chalcopyrite | 1.07 | 1.15 |
| Bornite | 0.00 | 0.00 |
| Other Cu Mins | 0.13 | 0.11 |
| Pyrite | 6.25 | 2.93 |
| Other Sulphides | 0.05 | 0.05 |
| Fe Oxides | 0.53 | 0.15 |
| Quartz | 26.56 | 22.16 |
| Feldspars | 24.29 | 28.29 |
| Muscovite/Sericite | 18.51 | 19.85 |
| Kaolinite/Clays | 10.36 | 23.38 |
| Biotite | 8.26 | 0.03 |
| Chlorite | 2.07 | 0.08 |
| Jarosite | 0.21 | 0.00 |
| Other Sulphates | 0.47 | 0.62 |
| Others | 1.01 | 1.09 |
| Total | 100 | 100 |

Figure 19:
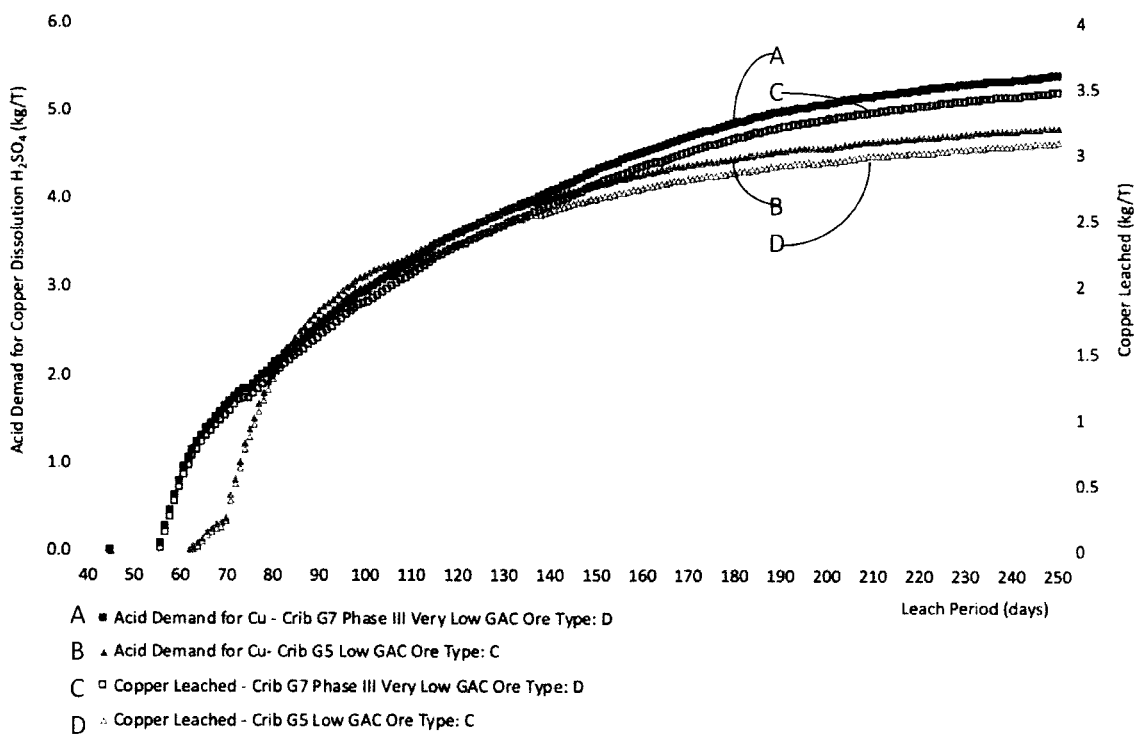
Figure 20:
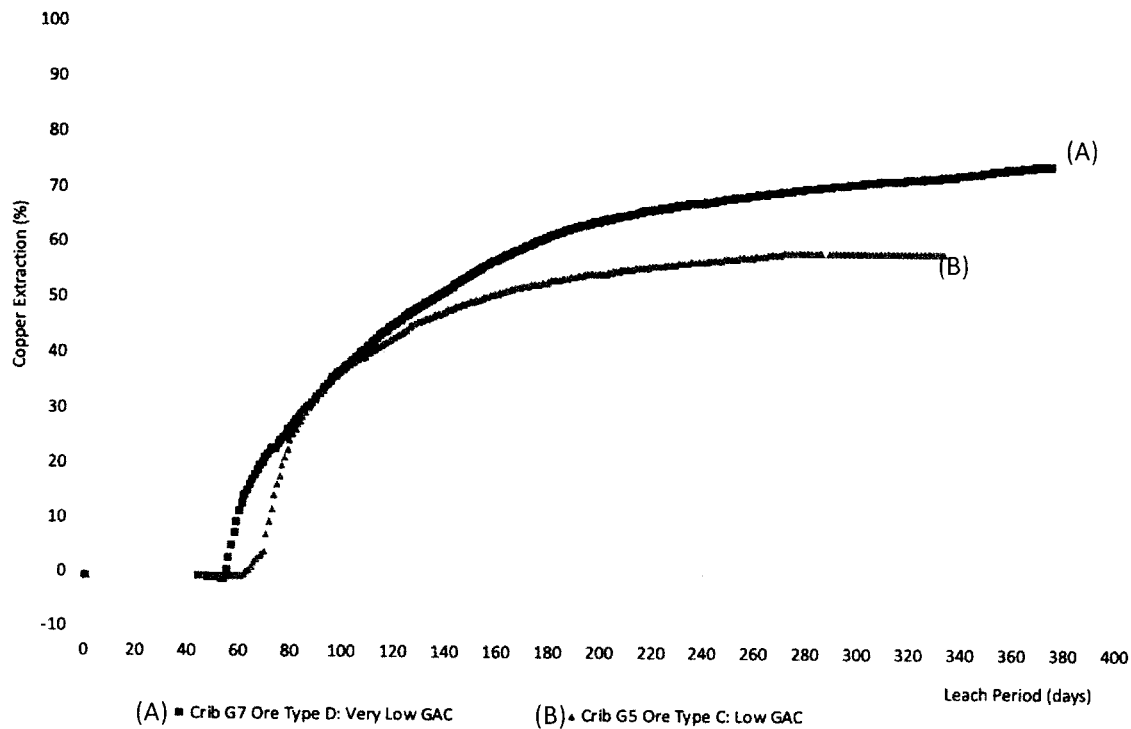

The total acid consumption includes acid for copper mineral leaching, and acid for gangue mineral leaching (GAC). The acid demand for copper mineral leaching is shown in FIG. 19, along with the mass of copper leached. The copper extraction achieved over the same period is shown in FIG. 20, for reference.

Figure 21:
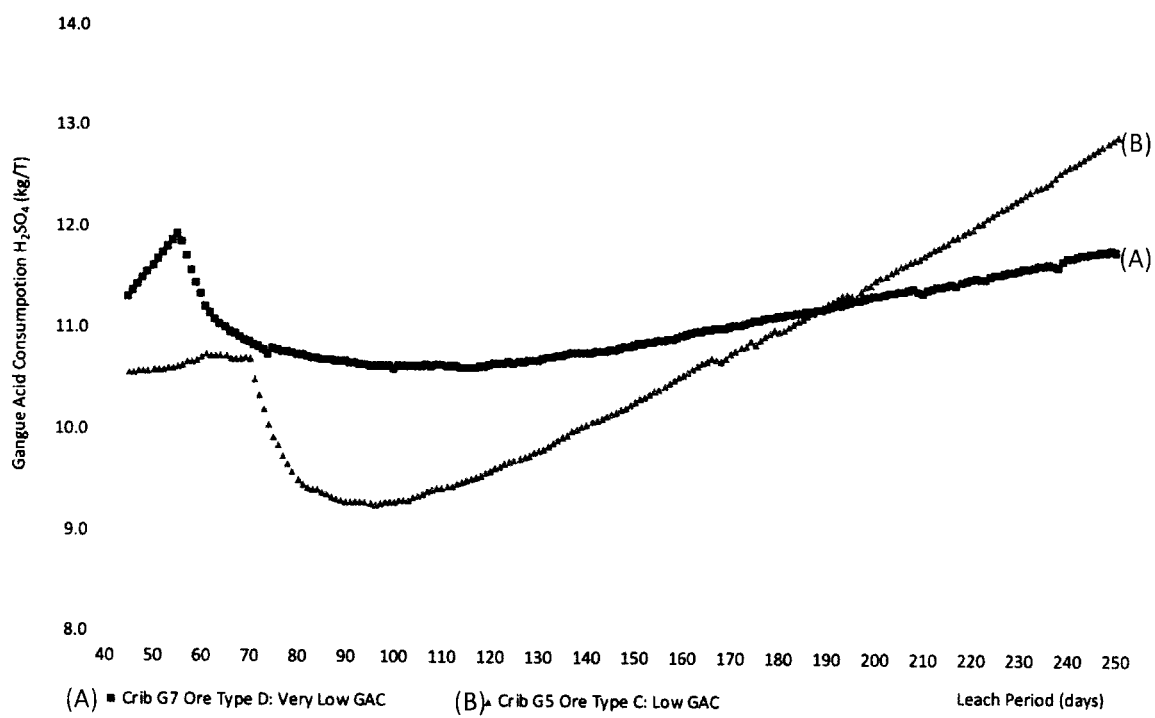

The gangue acid consumption (GAC), for a specific ore type and copper grade, may be estimated in the process of the invention by subtracting the acid demand for copper extraction from the total acid consumption. This result gives the net acid consumption (NAC) which in the case of the process of the invention is similar to the true GAC demand. The calculated gangue acid consumption for cribs G5 and G7 phase III is shown in FIG. 21.

In the stripping stage S1 of the SX pilot plant (shown in FIG. 13) copper is stripped from the loaded organic using spent electrolyte with a high acid content. The copper reports to the aqueous advance electrolyte solution which is circulated to copper recovery by electrowinning. The copper in the organic phase is replaced by acid and the resulting stripped organic, with a high acid content, is re-circulated to the copper extraction stage E1, where copper is extracted from the PLS, as shown in FIG. 13. Therefore, the SX process returns acid to the raffinate solution following copper extraction from the PLS. The acid in the raffinate is utilised to leach more copper minerals and to meet the GAC demand during the leach cycle.

The initial acid addition in ore agglomeration to crib G7 phase III (ore type D with a very low GAC) was 11.3 kg/T. In the case of crib G5 phase III (ore type C low GAC) the acid addition in ore agglomeration was 10.6 kg/T. In the case of crib G7 phase III, the initial acid concentration in solution was higher than crib G5 Phase III, due to the lower GAC rate of ore type D in the cure step. The higher initial acid concentration on irrigation of the ore in crib G7 phase III increased the acid consumption rate. However, once silicate gangue minerals became depleted the rate of acid consumption decreased. In the case of crib G5 phase III, the initial acid concentration was relatively low, and the initial rate of consumption was lower than crib G7 phase III, despite the higher GAC of ore type C in crib G5 Phase III. However, on irrigation with acid raffinate the GAC rate was clearly higher in the case of crib 5 phase III, such that towards the end of the leach at day 250, the GAC for crib G7 was 11.8 kg/T compared to crib G5 phase III at 12.9 kg/T. These trends are reflected in the corresponding PLS acid concentration profiles of both cribs shown in FIG. 22, and the corresponding PLS pH profiles in FIG. 23.

Figure 22:
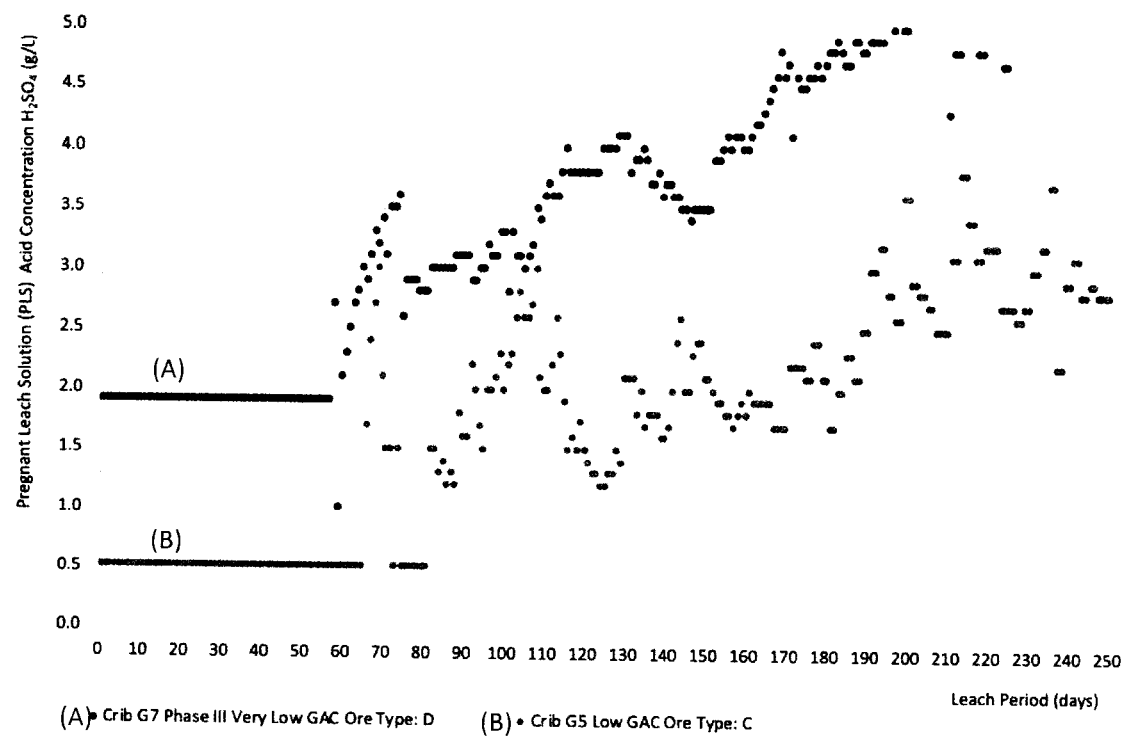
Figure 23:
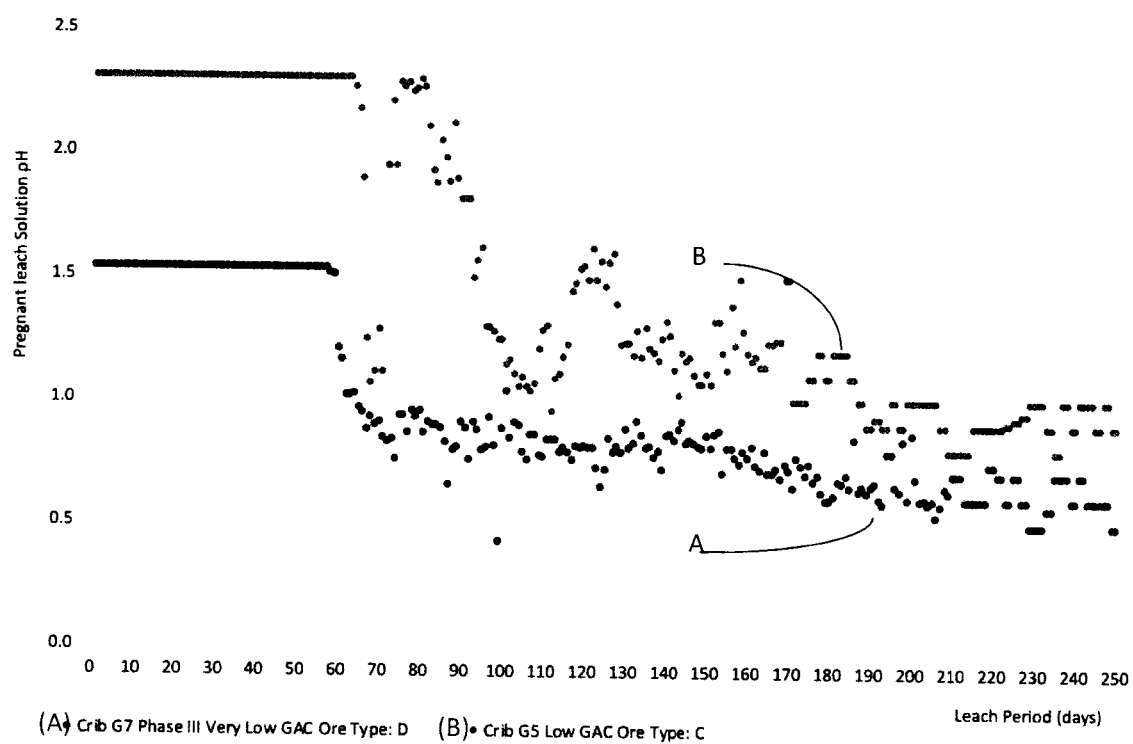

The initial acid concentration in solution on irrigation is dependent on the acid addition in ore agglomeration and the GAC demand of the ore. Too low an addition will limit initial free acid available for copper mineral leaching. Too high an addition will result in excess acid in the PLS in the leach stage which will adversely affect copper extraction by solvent extraction. The variation in acid consumption and solution acid concentrations presented in FIGS. 21 and 22, are within acceptable operating parameters for the process of the invention. The results demonstrate how a small difference in the ore GAC and acid addition influence acid concentrations in the PLS and show the importance of understanding the GAC of the ore types leached and the acid required for copper mineral leaching.

Figure 24:
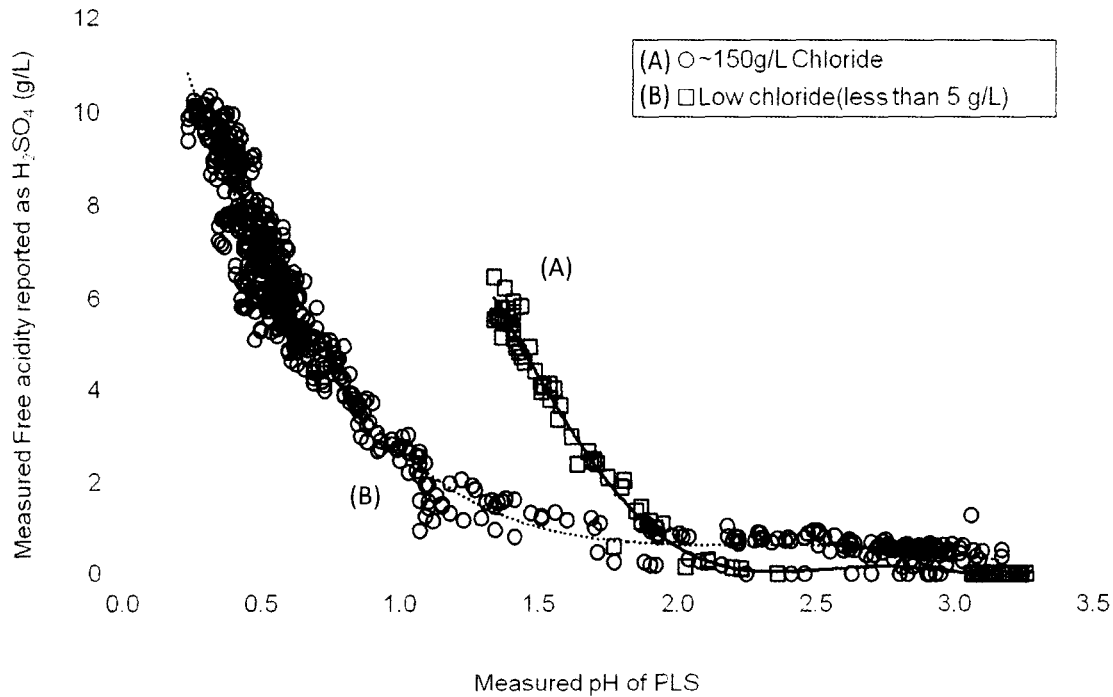

Example 6: The Effect of Chloride Concentration on the PLS Solution pH at Different Acid Concentrations The effect of the chloride concentration on the solution pH as a function of acidity is shown in the results presented in FIG. 24. The results show that at a low chloride concentration (<5 g/L chloride) the free acid concentration is 4 g/L at a solution pH 1.5. The corresponding pH at a high chloride concentration (150 g/L) is about pH 0.8. The efficiency of solvent extraction is dependent on the PLS pH. An ideal PLS pH is about pH1.5 to achieve maximum copper extraction efficiency in the SX step. The copper extraction efficiency is impaired below a PLS pH1. Therefore, it is clear in a high chloride PLS the free acidity should be as low as possible, below 10 g/L acid, or preferably below 7 g/L, more preferably below 2 g/L and ideally at 1 g/L.

Figure 25:
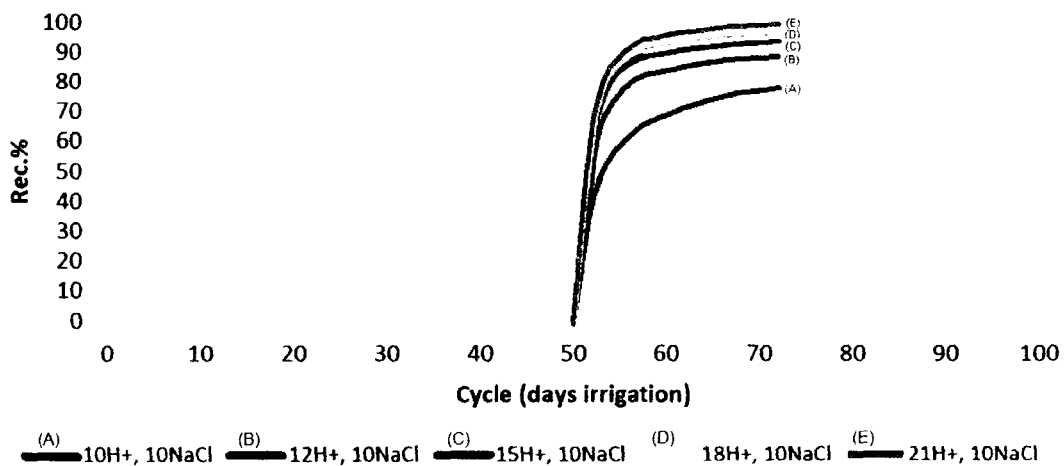

Example 7: The Effect of Acid Addition in Ore Agglomeration on Copper Recovery in a Cure Step A series of 1 m column tests show that, for example, with a specific ore type, where copper mineral dissolution in the cure step is high and limited by acid addition, that increasing the acid addition to ore agglomeration benefits the copper recovery. The results are shown in FIG. 25, where a fixed salt addition of 10 kg/T of ore was used and the sulfuric acid addition was varied from 10 kg/T to 21 kg/T of ore. The cure step following ore agglomeration was for a period of 50 days. The initial copper dissolution representing the copper leached in the cure step increased from about 30% to 80% with increased acid addition. The overall copper recovery increased from 78% to 98% in a 70 day total leach period, with a 20 day period of irrigation with raffinate solution.

Example 8: Example of Copper Dissolution Curves for Different Ore Types

Figure 26:
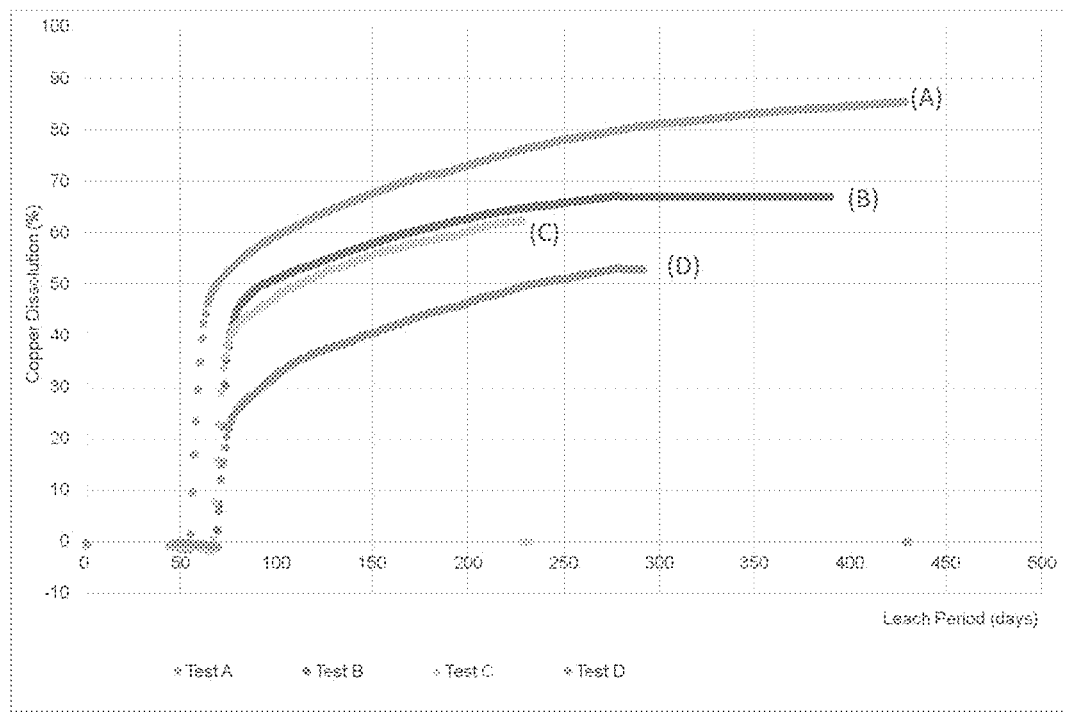

The copper dissolution by the method of high chloride (150 g/L chloride) heap leaching described herein is shown for different ore types in the results presented in FIG. 26. The results are for 6 m column tests using the method of high chloride (150 g/L) leaching described in the summary of invention. The acid addition to the ore in ore agglomeration, the overall acid consumption and NAC (total acid consumption less acid used to leach copper—this acid is returned from SX to the raffinate following copper extraction) is shown in Table 8. The results illustrate the high copper recovery that may be attained by the method of invention in the cure step when acid addition is not limiting. The results also show the significance of the copper recovery in the cure step compared to the overall copper recovery attained. The results apply to low grade high chalcopyrite ores (0.3% to 0.6% Cu) with a copper source ratio (CSR) as chalcopyrite in the range 40-75%.

TABLE 8

Acid Addition, Acid Consumption and Copper Recovery for Various Ores in 6 m Column Tests

| Test | Acid Addition in Ore Agglomeration (kg/T) | Overall acid Consumption (kg/T) | Net Acid Consumption (NAC) (kg/T) | Copper Recovery in Cure Step (%) | Overall Copper Recovery (%) |
|---|---|---|---|---|---|
| A | 11.3 | 23.0 | 16.2 | 50 | 85 |
| B | 10.9 | 22.5 | 16.8 | 45 | 67 |
| C | 10.3 | 14.4 | 11.9 | 40 | 62 |
| D | 10.6 | 22.0 | 17.5 | 25 | 53 |

Example 9: Moisture in Agglomeration—Effect on Cure Performance

The preceding examples discuss optimisation of the amount of acid added to the cure phase and the relevance thereof to the optimisation of the flowsheet. It is important to note that it has been determined that the method of how this acid is added affects the performance of the cure as well.

Figure 27:
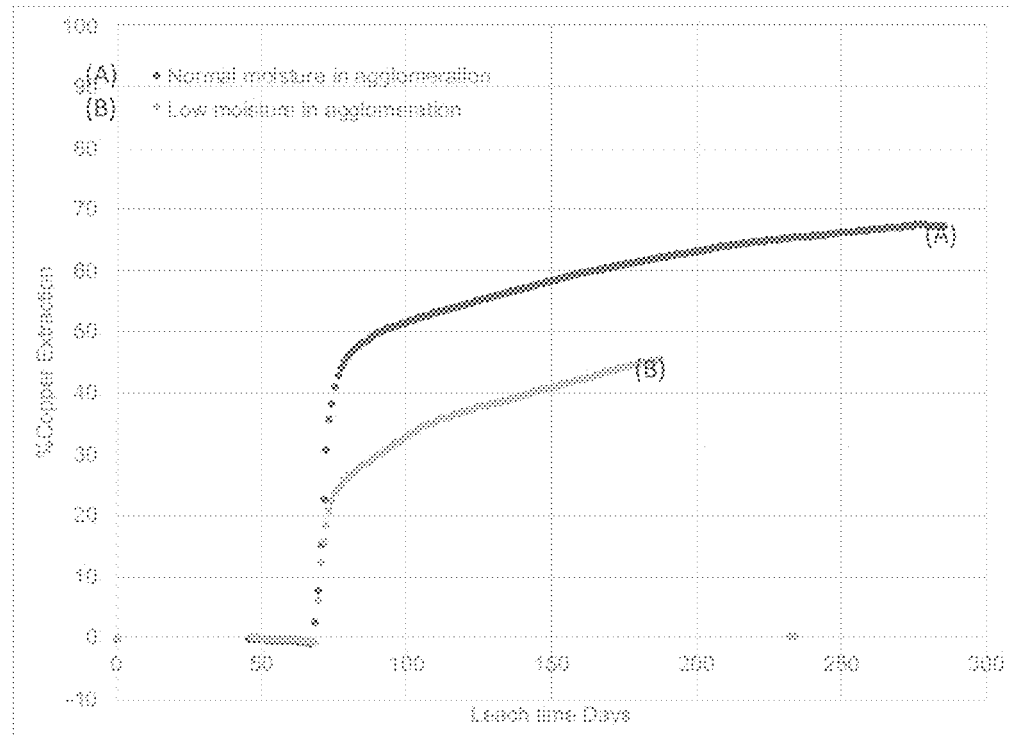

Process liquors are recycled to ore agglomeration to provide that moisture. This liquid volume in the ore bed represents the reactor solution volume where the generation of oxidant for mineral leaching occurs. The amount of oxidant produced per unit time is function of that volume of liquor. This oxidant is responsible for the oxidation of the copper sulfide minerals which leads to the solubilisation of the copper. If the amount of available liquid is restricted, then it is possible that insufficient oxidant will be produced, and this will limit the extent of mineral leaching. The effect is analogous to limiting acid addition to the ore such that insufficient acid is available to meet the requirement for metals dissolution considering the acid demand for both ore and gangue minerals. However, if too much process liquor is recycled to agglomeration, it can negatively impact on the agglomerate strength and thus the permeability of the heap to both gas and liquid flow. FIG. 27 shows the difference in leach performance for a column that has been supplied limited moisture (B) during agglomeration compared to a column that was supplied an ideal amount of moisture (A) during agglomeration. From the trends it is evident how insufficient moisture limits the copper dissolution.

The importance of this example is that although it shows that the cure phase copper leach can be altered by reducing acid or moisture (as in this case), the leach phase is not as efficient at leaching copper and so it does not "catch up". This is why, for the optimisation of the process, the modification of the flowsheet to counteract excessive acid in the leach is an optimal solution to ensure maximum copper recovery. Limitation of the cure phase should only be considered as an option of last resort.

The invention claimed is:

1. A method of controlling acid balance in a high chloride heap leach process carried out at ambient temperature, wherein a chloride concentration is between 100 g/L and 180 g/L to ensure that copper dissolution in an agglomeration stage is not limited by acid to maximize the copper dissolution in a cure phase and thereby increase an overall copper recovery, wherein the method comprises:
an agglomeration stage in which acid and process solutions are combined with an ore prior to stacking to form a heap;
an aerated, but non-irrigated, cure phase to leach a portion of copper in the ore in the heap, wherein the copper dissolution in the aerated, but non-irrigated, cure phase is at least 30% by mass; and
an irrigated leach phase during which remaining copper minerals are leached and copper is recovered from a pregnant leach solution by a solvent extraction process followed by an electrowinning process, and
wherein the heap comprises a plurality of heap sections in which excess acid in the irrigated leach phase is reduced by circulating leach-liquor to the plurality of heap sections counter-current to the ore loading onto the plurality of heap sections and removal of ore from the plurality of heap sections, thereby increasing acid consumption by gangue mineral dissolution in proportion to a number of the plurality of heap sections irrigated during the irrigated leach phase and acid concentration in the pregnant leach solution, which reports to the solvent extraction process, is less than 10 g/L, to allow effective copper recovery from the pregnant leach solution in the solvent extraction process.

2. The method according to claim 1, where overall copper dissolution in the aerated, but non-irrigated, cure phase and in the irrigated leach phase is greater than 40% by mass.

3. The method according to claim 1, wherein an acid concentration in the pregnant leach solution is lower than 7 g/L.

4. The method according to claim 3, wherein the acid concentration in the pregnant leach solution is lower than 2 g/L.

5. The method according to claim 1, where a raffinate generated during the solvent extraction process comprises a copper content that is less than 1 g/L.

6. The method according to claim 5 wherein the copper content is less than 0.5 g/L.

7. The method according to claim 1, wherein, after completion of the irrigated leach phase, the heap is washed.

8. The method according to claim 1, wherein a quantity of acid added during the method is calculated from acid consumed by gangue minerals and acid required to leach the copper minerals.

9. The method according to claim 8, wherein acid required for copper leaching is added to the ore during the agglomeration stage.

10. The method according to claim 8, wherein acid addition to a raffinate solution which is used to irrigate the heap is done to meet increased acid demand by mineral leaching in the irrigated leach phase.

11. The method according to claim 8, which further comprises a preceding process of conducting tests to determine the acid consumed by the gangue minerals for a specific type of ore as a function of at least one of the following: solution pH, acid concentration, temperature, and ore particle size.

12. The method according to claim 1, wherein an optimal addition of acid added during the method is determined by content of acid-soluble gangue minerals and the copper minerals in the ore.

13. The method according to claim 12, wherein the pregnant leach solution collected from initial irrigation of the heap following the aerated, but non-irrigated, cure phase is added to the ore during the agglomeration stage so as to utilize acid content in the pregnant leach solution during a subsequent cure phase.

14. The method according to claim 12, wherein acid added to the ore during the agglomeration stage is determined by demand for copper mineral and gangue mineral dissolution in the aerated, but non-irrigated, cure phase.

* * * * *